US009881332B2

(12) United States Patent
Bloem et al.

(10) Patent No.: US 9,881,332 B2
(45) Date of Patent: Jan. 30, 2018

(54) SYSTEMS AND METHODS FOR CUSTOMIZING SEARCH RESULTS AND RECOMMENDATIONS

(71) Applicant: LogoMix, Inc., Boston, MA (US)

(72) Inventors: Craig J. Bloem, Boston, MA (US); Phillip M. McMannis, Brookline, MA (US)

(73) Assignee: LogoMix, Inc., Boston, MA (US)

( * ) Notice: Subject to any disclaimer, the term of this patent is extended or adjusted under 35 U.S.C. 154(b) by 0 days.

(21) Appl. No.: 14/285,061

(22) Filed: May 22, 2014

(65) Prior Publication Data
US 2015/0339754 A1 Nov. 26, 2015

(51) Int. Cl.
*G06Q 30/06* (2012.01)
*G06F 17/30* (2006.01)
*G06Q 30/02* (2012.01)

(52) U.S. Cl.
CPC ... *G06Q 30/0631* (2013.01); *G06F 17/30867* (2013.01); *G06Q 30/02* (2013.01); *G06Q 30/0255* (2013.01)

(58) Field of Classification Search
CPC .............................................. G06Q 30/0631
USPC ....................................................... 705/26.7
See application file for complete search history.

(56) References Cited

U.S. PATENT DOCUMENTS

| 6,119,155 A | 9/2000 | Rossmann et al. |
| 8,208,762 B1 | 6/2012 | Berger et al. |
| 8,667,005 B2 | 3/2014 | Edwards et al. |
| 8,866,841 B1 | 10/2014 | Distler |
| 2002/0025085 A1* | 2/2002 | Gustafson .............. G06Q 30/06 382/311 |

(Continued)

OTHER PUBLICATIONS

International Search Report and Written Opinion dated Aug. 14, 2015 in connection with International Application No. PCT/US2015/032165.

(Continued)

*Primary Examiner* — Yogesh C Garg
*Assistant Examiner* — Lalith Duraisamygurusamy
(74) *Attorney, Agent, or Firm* — Wolf, Greenfield & Sacks, P.C.

(57) ABSTRACT

A recommendation system can be configured to customize search results and/or recommendations of content (e.g., customized products, products, advertising, layouts, etc.) using online and/or offline activity captured on a user population. The system can be configured to customize the content returned to users to achieve specific behaviors and/or influence the current user's behavior, responsive to modeling previous users. For example, the system can capture and aggregate user behavior/activity and score content based on the actions taken with respect to the content. In some examples, the scoring can be filtered or augmented by matching current user characteristics to characteristics of the previous users. The scoring can be generated independent of the language in which the activity/user behavior occurred. According to one embodiment, the system is configured to generate language independent models and utilize the language independent modeling to deliver customized content (e.g., recommendations and/or search results) without conventional constraints.

23 Claims, 20 Drawing Sheets

(56) References Cited

U.S. PATENT DOCUMENTS

| | | | |
|---|---|---|---|
| 2002/0052782 A1* | 5/2002 | Landesmann | G06Q 20/20 705/14.2 |
| 2003/0098862 A1 | 5/2003 | Hunt et al. | |
| 2003/0103089 A1 | 6/2003 | Ramani et al. | |
| 2004/0046788 A1 | 3/2004 | Keane et al. | |
| 2004/0177001 A1 | 9/2004 | Salinas | |
| 2004/0205117 A1 | 10/2004 | Hertling et al. | |
| 2004/0239679 A1 | 12/2004 | Ito et al. | |
| 2005/0162670 A1 | 7/2005 | Shuler | |
| 2005/0177453 A1 | 8/2005 | Anton | |
| 2005/0268216 A1 | 12/2005 | Hayes et al. | |
| 2007/0035746 A1 | 2/2007 | Jecha et al. | |
| 2008/0163069 A1 | 7/2008 | Eilers | |
| 2009/0051977 A1 | 2/2009 | Moody | |
| 2009/0327875 A1 | 12/2009 | Kinkoh | |
| 2010/0179889 A1* | 7/2010 | Johnsmeyer | G06Q 30/02 705/28 |
| 2010/0257210 A1 | 10/2010 | Witkin et al. | |
| 2011/0072988 A1 | 3/2011 | Elgar et al. | |
| 2011/0125614 A1 | 5/2011 | Dollens | |
| 2011/0137989 A1* | 6/2011 | Kiciman | G06Q 30/02 709/204 |
| 2011/0289451 A1* | 11/2011 | Fischer | G06F 9/4443 715/808 |
| 2012/0009036 A1* | 1/2012 | Marcos | B44B 3/006 409/84 |
| 2012/0079374 A1 | 3/2012 | Gaddis | |
| 2012/0259727 A1 | 10/2012 | Fermin et al. | |
| 2012/0271835 A1 | 10/2012 | Gaude | |
| 2013/0073583 A1* | 3/2013 | Licata | G06F 17/30967 707/769 |
| 2013/0124449 A1* | 5/2013 | Pinckney | G06F 17/30867 706/52 |
| 2013/0174014 A1 | 7/2013 | Kwan et al. | |
| 2013/0174015 A1 | 7/2013 | Kwan | |
| 2013/0335437 A1 | 12/2013 | Lynn et al. | |
| 2014/0019868 A1 | 1/2014 | Varian | |
| 2014/0052549 A1 | 2/2014 | Dollens | |
| 2014/0067596 A1* | 3/2014 | McGovern | G06Q 30/02 705/26.7 |
| 2014/0089789 A1 | 3/2014 | Schowtka et al. | |
| 2014/0096048 A1* | 4/2014 | Rottler | G06F 3/0486 715/769 |
| 2014/0108427 A1 | 4/2014 | Spiegel | |
| 2014/0132988 A1 | 5/2014 | Keane et al. | |
| 2014/0313206 A1 | 10/2014 | George et al. | |
| 2014/0344102 A1* | 11/2014 | Cooper | G06Q 30/0631 705/26.7 |
| 2015/0213625 A1 | 7/2015 | Berger et al. | |
| 2015/0339276 A1 | 11/2015 | Bloem et al. | |
| 2015/0339731 A1 | 11/2015 | Bloem et al. | |

OTHER PUBLICATIONS

International Search Report and Written Opinion dated Aug. 21, 2015 in connection with International Application No. PCT/US2015/032166.

U.S. Appl. No. 14/285,122, filed May 22, 2014, Bloem et al.

U.S. Appl. No. 14/285,129, filed May 22, 2014, Bloem et al.

PCT/US2015/032165, Aug. 14, 2015, International Search Report and Written Opinion.

PCT/US2015/032166, Aug. 21, 2015, Internatioanl Search Report and Written Opinion.

* cited by examiner

Boat

FreeLogoServices.com | Login

Start Your Logo    🛡 Privacy Policy

Already have an Account? Sign in Now — 702

Logo Category: [Other ▾]

First Line of Logo Text*: [Max 30 Characters]

Second Line of Logo Text (Optional): [Max 30 Characters]

Type of Logo (Optional): [Ex. Car, Dog, Bakery, Salon]

First Name*: [ ]

Last Name*: [ ]

Country: [United States ▾]

Email*: [ ]

Why?

Phone*: [ ]

Submitting this form confirms your agreement to FreeLogoServices.com's Terms and Conditions 704 — Why you'll love FreeLogoServices.com 708 — ✓ Trusted
Used by more 100,00 satisfied customers 706 — ✓ Quality
We use award winning professional logo designers 710 — ✓ Try It Free
Design a free logo and pay $39.95 for unlimited use 712 — ✓ Large Selection
Choose from 1000's of logos by industry 714, 716, 718

(Choose a Design ⌄) — 720

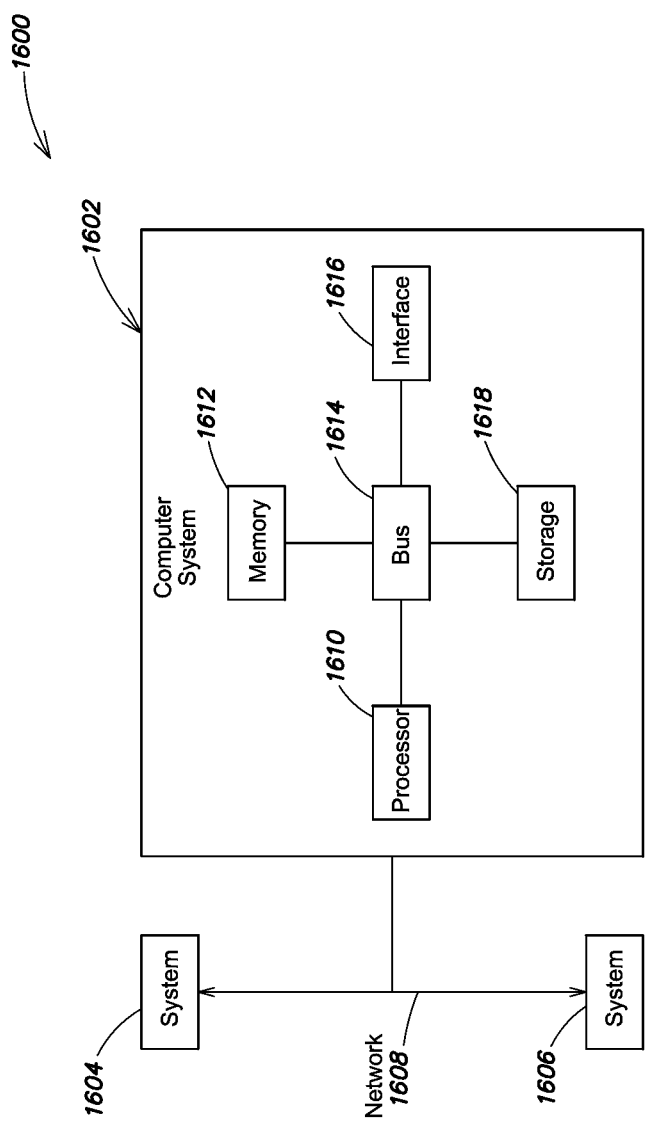

Info About Searched Items

INDEXES — 1702

| Standard | Type |
|---|---|
| 1704—Tags | Text, Categories |
| 1706—Item Name | Text |
| 1708—Item Description | Text |
| 1710—Item Properties | Text Categories (Size, Color, etc.) Free or Predefined |

1712 — Info About User Interest and Self Reported

| User Entered | Type |
|---|---|
| 1714—Search Query | * Text<br>* Navigation<br>* Facet Selection |
| 1716—User Custom Text | Text |
| 1718—User Entered/ Defined Properties | Text<br>Comp Name<br>Logo Text<br>Interests |

1720 — Info About User, Clarification, or Non-Selected Properties

| User Demographics | 1722 |
|---|---|
| 1724—Language | |
| 1726—Country | |
| 1728—Acquisition Channel | |
| 1730—Activity (# of visits) | |
| 1732—Activity Off Site | Visits CNN<br>vs<br>Visits Huff Post |

1734 — USER ACTIVITY RELATED TO ITEM
Ex: 300 Clicks on Item
TAGGED BY ELEMENT BEING USED

*FIG. 17*

SYSTEMS AND METHODS FOR CUSTOMIZING SEARCH RESULTS AND RECOMMENDATIONS

BACKGROUND

Many conventional approaches exist for customizing recommendations. In some embodiments, customized recommendations can be delivered responsive to user entered searches. Further, on-line activity by the user can be tracked by various sites and used to customize advertising delivered to the user. For example, cookies are known mechanisms that track user on-line activity and can be used to deliver product recommendations based on access items, searches, and/or purchases.

SUMMARY

It is realized that conventional approaches can fail to develop contextually relevant recommendations and/or search results. It is further realized that conventional recommendation systems can be limited to specific sites on which user information is collected. Further limitations for conventional recommendation systems exist in terms of language and meaning. Accordingly, various aspects and embodiments of a recommendation system are provided to overcome at least some of the failings of conventional approaches.

According to one embodiment, a recommendation system is configured to customize search results and/or recommendations using online and/or offline activity captured on a user population. The system can be configured to customize content (e.g., search results, product lists, recommendations, etc.) returned to users based on actions and/or behaviors observed in previous users. The customized content can be delivered based on analyzing previous actions and/or behavior of previous like users and/or previous like searches. In some embodiments, modeling of like users and/or similar searches on previous behaviors and/or actions leads to customized content (e.g., search results) that would be missed by conventional approaches. In some examples, the system can also be configured to achieve specific behaviors and/or influence the user's behavior responsive to modeling respective users within the user population.

According to various embodiments, the recommendation system can be implemented in an ecommerce environment. According to one embodiment, the system can be configured to deliver customized content (e.g., search results, product lists, recommendations, etc.) to users based on actions and/or behaviors observed in previous users. In some examples, the recommendation system can be configured to deliver products and/or search results within a user's shopping cart or shopping experience.

According to some embodiments, the system can capture and aggregate user behavior and/or user activity to develop user models and/or models of searches entered or performed by users. In some embodiments, the models are developed such that language is irrelevant to the model information. According to one embodiment, the system is configured to generate language independent models and utilize the language independent modeling to deliver customized content (e.g., recommendations and/or search results) without conventional constraints. Further, by modeling previous actions and behavior, the models emphasize customized content missed, for example, by relevancy searching or tagged knowledge bases.

According to another embodiment, the system can build behavior models using language specific activity and return matching models within a matching language. In such a manner the system can be configured to eliminate the need to understand the particular context/nuance of the subject language by matching activity/behavior to models within an identified language and returning results from historic behavior accordingly.

In one example, the system is configured to model user activity/user behavior based on previous user interactions with content (e.g., each response returned to a user query, search, selection, and/or on-line navigation). The user activity/behavior can be scored by the system and associated with respective content (e.g., a respective product, a respective search result, etc). The respective scores can be used to customize content displays shown to the user. In some embodiments, the recommendation system can be implemented in any user environment where search functions are used to locate results to present to a user. In one example environment, the system can capture user activity information in a custom product development environment. In another example, the system can capture user activity information in any ecommerce environment, and score potential results to display to the user based on the user activity information, for example, in the user's shopping cart.

In one example, the custom product environment can include tools for creating custom product designs. In another example, custom product design can include selection of text and image data to bundle with a product selection. According to some embodiments, the system can index any user selection of images, input text, product template, and/or specific products, to build user models and/or score content. The user models are analyzed by the system to return contextually relevant results and/or generate new recommendations to a user based on modeled information.

According to another example, the ecommerce environment can include tools, displays, search functions, etc., to enable any user to input search characteristics and receive from the system, for example, matching products. In some examples, users can receive search results selected by the system based on prior user actions, including for example, prior user searches and/or product selections made by the prior users after entering a same or similar search.

In further embodiments, content on a website (including, for example, custom products, results in a search result list, etc.) is scored based on the identified user activity. Each action associated with specific content (e.g., view product, add product to cart, purchase product, access search result, etc.) can be assigned a value and respective content can be evaluated and/or ranked based on respective score. Scoring rules can be tailored to favor specific behaviors according to the services/goods offered on a site and may be executed against historical data filtered by user models. In various embodiments, scoring and user model filtering of data increases the relevancy of content displayed to end-users and can further increase the likelihood of achieving desired action with respect to each user.

According to one aspect, a system for customizing displayed content selections is provided. The system comprises at least one processor operatively connected to a memory; a search component, executed by the at least one processor, configured to accept search selection in a user interface displayed to a user, and display search results in to the user in the user interface; a modeling component, executed by the at least one processor, configured to score previous users' actions associated with content items displayed to the user; and wherein the search component is further configured to identify search results based, at least in part, on respective action scores assigned to respective content items.

In one embodiment, the modeling component is configured execute scoring rules to assign an action value to a respective content item based on a prior user action, and associate the action value to the respective content item. In one embodiment, the search component is further configured to order the search results based on the previous users' actions. In one embodiment, the scoring rules include a plurality of levels for categorizing previous users' actions, and the modeling component is configured to assign the action value based on a determined level associated with the user action. In one embodiment, the scoring rules generate an additive action score for the respective content items.

In one embodiment, the search component is configured to generate relevant results based at least in part on a highest action score associated with content items. In one embodiment, the system further comprises a matching component, executed by the at least one processor, configured to match a current user's characteristics to characteristics of prior users. In one embodiment, the matching component is configured to filter the previous users' actions scored by the modeling component responsive to matching the current user's characteristics to prior users. In one embodiment, the search component is configured to capture search selections responsive to a user adding a product to an online shopping cart. In one embodiment, the search results identified by the search component are displayed to the user as additional selection options for the online shopping cart. In one embodiment, the search component is configured to capture search selection responsive to a user navigating within an ecommerce website. In one embodiment, the search results identified by the search component are displayed to the user as additional selection options within the ecommerce site.

According to one aspect, computer implemented method for customizing displayed content selections is provided. The method comprises receiving from a user interface displayed to a user search selection; communicating search results for display to the user in the user interface; scoring, by a computer system, previous users' actions associated with content items displayed to the user; and identifying, by the computer system, search results based, at least in part, on respective action scores assigned to respective content items.

In one embodiment, scoring includes an act of executing, by the computer system, scoring rules to assign an action value to a content item based on a prior user action with the content item. In one embodiment, scoring includes an act of executing, by the computer system, scoring rules to assign an action value to a content item based on determining a level to assign to the prior user action with the content item. In one embodiment, the scoring including adding the action value to any existing action value for the content item. In one embodiment, identifying, by the computer system relevant results to include in the search results based, at least in part, on highest respective action scores assigned to respective content items.

In one embodiment, the method further comprises matching, by the computer system, a current user's characteristics to characteristics of prior users. In one embodiment, matching includes filtering the previous users' actions scored by the modeling component responsive to matching the current user's characteristics to prior users. In one embodiment, the act of receiving from a user interface displayed to a user the search selection includes capturing the search selection responsive to a user adding a product to an online shopping cart. In one embodiment, the system further comprises an act of displaying the search results as additional selection options within the online shopping cart. In one embodiment, the act of receiving from a user interface displayed to a user the search selection includes capturing the search selection responsive to a user navigating within an ecommerce website. In one embodiment, the search results identified by the search component are displayed to the user as additional selection options within the ecommerce site.

According to one aspect, a system for customizing displayed content selections is provided. The system comprises at least one processor operatively connected to a memory; a search component, executed by the at least one processor, configured to accept search selection in a user interface displayed to a user, and display search results in to the user in the user interface; a modeling component, executed by the at least one processor, configured to score user actions associated with content items displayed to the user; and wherein the search component is further configured to identify relevant results responsive to search selections based, at least in part, on respective action scores assigned to respective content items.

In one embodiment, the modeling component is configured to execute scoring rules to assign an action value based on a prior user action, and associate the action value to the a respective content item associated with the user action. In one embodiment, the scoring rules include a plurality of levels for categorizing user actions, and the modeling component is configured to assign the action value based on a determined level associated with the user action. In one embodiment, the scoring rules generate an additive action score for respective content items. In one embodiment, the search component is configured to generate relevant results based at least in part on a highest action score associated with content items.

In one embodiment, the system further comprises a matching component, executed by the at least one processor, configured to match a current user's characteristics to characteristics of prior users. In one embodiment, the matching component is configured to filter prior user actions scored by the modeling component responsive to matching the current user's characteristics to prior users.

In one embodiment, the content items include custom images and wherein the search component is configured to return the custom images responsive to user input of text to include in a logo design. In one embodiment, the custom images are assigned a respective action score based on prior user interactions with the respective custom image. In one embodiment, the prior user interactions include at least one of: viewing of an custom image, incorporating a custom image into a logo design, saving an logo design, or purchasing a logo design, and wherein the modeling component is configured execute scoring rules to assign an action value to the custom image based on the respective action. In one embodiment, the modeling component is configured to execute scoring rules to assign an action value to the custom image based on a plurality of levels for categorizing user actions. In one embodiment, modeling component is configured to generate a language independent action score, wherein generating a language independent action score includes at least of: filtering prior user interactions based on an associated language or scoring a custom image and logo text entirely on previous user actions.

According to one aspect, a computer implemented method for customizing displayed content selections is provided. The method comprises receiving from a user interface displayed to a user search selection; communicating search results for display to the user in the user interface;

scoring, by a computer system, user actions associated with content items displayed to the user; and identifying, by the computer system, relevant results to include in the search results based, at least in part, on respective action scores assigned to respective content items.

In one embodiment, scoring includes an act of executing, by the computer system, scoring rules to assign an action value to a content item based on a prior user action with the content item. In one embodiment, scoring includes an act of executing, by the computer system, scoring rules to assign an action value to a content item based on determining a level to assign to the prior user action with the content item. In one embodiment, the scoring includes adding the action value to any existing action value for the content item. In one embodiment, identifying, by the computer system relevant results to include in the search results based, at least in part, on highest respective action scores assigned to respective content items.

In one embodiment, the method further comprises matching, by the computer system, a current user's characteristics to characteristics of prior users. In one embodiment, matching includes filtering prior user actions scored by the modeling component responsive to matching the current user's characteristics to prior users.

In one embodiment, the content items include custom images and wherein communicating search results for display to the user in the user interface includes identifying relevant custom images responsive to user input of text to include in a logo design. In one embodiment, scoring includes assigned a respective action score to the custom images based on prior user interactions with the respective custom image. In one embodiment, the prior user interaction includes at least one of: viewing of an custom image, incorporating a custom image into a logo design, saving a logo design, or purchasing a logo design, and wherein scoring includes assigning an action value to the custom image based on the respective action.

In one embodiment, scoring includes assigning an action value to the custom image based on a plurality of levels for categorizing user actions. In one embodiment, scoring includes generating a language independent action score, wherein generating a language independent action score includes at least of: filtering prior user interactions based on an associated language or scoring a custom image and logo text entirely on previous user actions.

According to one aspect provided is a system for customizing displayed content selections. The system comprises at least one processor operatively connected to a memory, a search component, executed by the at least one processor, configured to accept search selection in a user interface displayed to a user, and display search results in to the user in the user interface, and a modeling component, executed by the at least one processor, configured to score user actions associated with content items displayed to the user, the search component is further configured to identify search results based, at least in part, on respective action scores assigned to respective content items.

Various embodiments of the system incorporate any one, two, three, four, five, six, seven, eight, nine, ten, more, or all of the following elements: wherein the modeling component is configured execute scoring rules to assign an action value to a respective content item based on a prior user action, and associate the action value to the respective content item, wherein the search component is further configured to order the search results based on users activity, wherein the scoring rules include a plurality of levels for categorizing user actions, and the modeling component is configured to assign the action value based on a determined level associated with the user action, wherein the scoring rules generate an additive action score for the respective content items, wherein the search component is configured to generate relevant results based at least in part on a highest action score associated with content items, wherein the system further comprises a matching component, executed by the at least one processor, configured to match a current user's characteristics to characteristics of prior users, wherein the matching component is configured to filter prior user actions scored by the modeling component responsive to matching the current user's characteristics to prior users, wherein the search component is configured to capture search selections responsive to a user adding a product to an online shopping cart, wherein the search results identified by the search component are displayed to the user as additional selection options for the online shopping cart, wherein the search component is configured to capture search selection responsive to a user navigating within an ecommerce website, and wherein the search results identified by the search component are displayed to the user as additional selection options within the ecommerce site.

According to one aspect provided is a computer implemented method for customizing displayed content selections. The method comprises receiving from a user interface displayed to a user search selection, communicating search results for display to the user in the user interface, scoring, by a computer system, user actions associated with content items displayed to the user; and identifying, by the computer system, search results based, at least in part, on respective action scores assigned to respective content items.

Various embodiments of the method incorporate any one, two, three, four, five, six, seven, eight, nine, ten, more, or all of the following elements: wherein scoring includes an act of executing, by the computer system, scoring rules to assign an action value to a content item based on a prior user action with the content item, wherein scoring includes an act of executing, by the computer system, scoring rules to assign an action value to a content item based on determining a level to assign to the prior user action with the content item, wherein the scoring including adding the action value to any existing action value for the content item, wherein identifying, by the computer system relevant results to include in the search results based, at least in part, on highest respective action scores assigned to respective content items, wherein the method further comprises matching, by the computer system, a current user's characteristics to characteristics of prior users, wherein matching includes filtering prior user actions scored by the modeling component responsive to matching the current user's characteristics to prior users, wherein the act of receiving from a user interface displayed to a user the search selection includes capturing the search selection responsive to a user adding a product to an online shopping cart, wherein the method further comprises an act of displaying the search results as additional selection options within the online shopping cart, wherein the act of receiving from a user interface displayed to a user the search selection includes capturing the search selection responsive to a user navigating within an ecommerce website, wherein the search results identified by the search component are displayed to the user as additional selection options within the ecommerce site.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by reference signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

FIG. 7A-B are screen captures of example user interfaces, according to one embodiment;

FIG. 16 is a block diagram of a general purpose computer system on which various aspects can be practiced.

FIG. 17 is a conceptual data model for classifying information obtained on search and/or user behavior, according to one embodiment;

DETAILED DESCRIPTION

Figure 1:
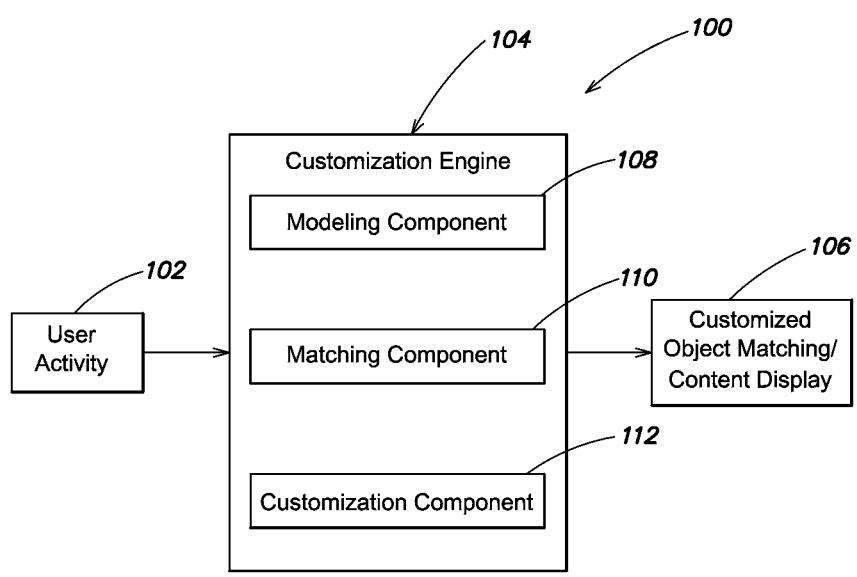
FIG. 1 is a block diagram of a system for generating customized recommendations, according to one embodiment.

As described above, traditional methods of optimizing search results and recommendations can fail to provide contextually relevant recommendations and/or search results. Further, conventional approaches can fail to deliver results and recommendations that are configured to achieve specific user behaviors and/or specific business goals, for example, of the entity providing the search functionality. Accordingly, there is a need for systems and methods of result optimization and/or recommendation generation that deliver search results and/or product recommendations based on a likelihood of achieving a specific behavior and/or business goal.

According to one embodiment, a system is provided that includes a customization engine that receives search activity from users. As an example, the search activity can include user input search terms, search navigation, browser selections, etc. The system and/or customization engine can be configured to process the search activity to modify displays of relevant products, images, or other content to the user. The system and/or engine can be configured to generate such results or other computer content to drive the viewing user to a specific end result. In one embodiment, the system analyzes user interactions and user collected data to build user models. The system can develop user models based on historic data of other users that have exhibited specific patterns (e.g., viewed this object, set of objects, etc., resulting in a purchase of one or more objects) or specific interactions with content (e.g., search on "term," accessed a result, or ended a search session). The system can develop a multitude of user models that characterize potential future users.

According to other embodiments, the system can implement a model that processes information on a current user (e.g., current language, previous activity, any on-line trail, any user profile, etc.) to filter and/or weight historical information relevant to a respective user. Based on similarity between any one or more of a current user's patterns, user interactions, etc., the system can deliver optimized results to increase the likelihood of achieving a successful end result from the user (e.g., the end result can be a purchase, finding desired information, etc.).

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 is a block diagram of an example system 100 for optimizing returned content 106 for display on a computer system, responsive to user behavior 102, including, for example, user search activity. According to one embodiment, system 100 can include a customization engine 104 configured to process user behavior 102 and modify content displays (e.g., 106) shown to the user based on analyzing the user and/or the user's behavior against user model(s). Alternatively, the system 100 can perform the functions and/or operations discussed with respect to customization engine 104 and/or other system components itself and need not include specific components configured to perform the discussed functions and/or operations.

According to one embodiment, system 100, engine 104, and/or elements of the system can be implemented on a specially configured general purpose computer system (e.g., computer system 1600 and/or 1602 discussed below with respect to FIG. 16). According to various examples, the engine 104 when executing can be configured to analyze user behavior, determine a similar user/behavior model, and modify content displays shown to the user in order to drive the user to a specific act and/or activity.

In one embodiment, the system 100 and/or engine 104 can include a modeling component 108 configured to generate user models. The modeling component 108 can also be configured to modify existing models dynamically. For example, as new user behavior information is collected, the modeling component can update existing user models based on newly collected or received behavior information.

According to one embodiment, the modeling component 108 can be configured to capture or receive information on any one or more of: user online interactions, specific website interactions, user(s) viewing sections of website(s), viewing web-page(s), viewing content, viewing objects, viewing products, achieving identified goals (e.g., clicking on pre-defined selection(s) on a website, executing identified navigation options on a website, making a product purchase, etc.), or applications a user accesses or uses. Some examples of model information collected can include, any one or more of: clicking on certain objects on-line, adding objects to a shopping cart, mouse movements, viewing an object in user interface delivered from a website, dwell time associated with a page, object, and/or site, a product, a webpage, or spending extra time on a particular page or in front of a object, among other options.

In further embodiments, the modeling component 108 is configured to capture or receive information on the language the user is employing, and any language associated with the user's activity (e.g., display language of a site), language associated with displayed ads, content, among other options. The user's activity can be associated and/or indexed on an identified language. The system can be configured to match users to models such that for subsequent users interacting with the same or similar environment (e.g., same language), personalizations and recommendations can be delivered by the system independent of meaning of the language being employed.

According to one embodiment, the system 100 and/or engine 104 can include a matching component 110 configured to match a current user to existing user models. The matching component 110 can be configured to use information captured on the current user to determine a match with a user model. Each user model developed by the modeling component can be generated to emphasize a variety of historical user behaviors. Based on similarity between the current user and previous user, the system can identify the user model most likely to describe the current user's behavior, for example, on a retail website.

In some embodiments, the matching component 110 can be configured to match current users to historical user behavior. The matching component 110 can be configured to analyze any one or more of: current language, any user entered information (e.g., age, company name, actual name, search text entered by the user, demographic information, user profile information, user history, etc), and user generated information (e.g., content contribution to a website, posted pictures, posted write-ups/text/notes, etc.), and location based information (e.g., current geography of user) among other options. In further examples, the system and/or matching component 110 can use visually captured information on users, including, for example, user facial expressions, type of clothing, environment, etc., to identify matching user models. In yet other examples, pictures posted of the user can be analyzed to capture user facial expressions, type of clothing, photographed environment, etc. In some embodiments, visual information can be captured from video feeds, in-store cameras, or captured from image information posted by the user.

Based on accumulated information for a current user, the system can identify matching models and display relevant content. The relevant content can be automatically generated by the system based on other people/users that exhibit similar characteristics or have similar data. Further, the modeling information can also include weightings for desired user activity. For example, the user model information can be configured to favor user behavior leading to a product purchase over a product view. Such weightings can be modified based a degree of matching. In further examples, weighting of model information, including behavior and user activity, can be weighted based on a level of interaction. For example, within a retail site levels of interaction can depend on steps required to make a purchase. The further along the user behavior is towards completing a purchase the higher the weighting associated with the user's activity.

According to some embodiments, the user models link previous user behavior to desired outcomes. For example, on the retail web site, the user model can indicate an increased likelihood of consummating a sale based on viewing of a number of specific products and/or performing specific activities on the retail site. The system 100 can be configured to deliver those specific products to the user (e.g., based on information derived by the matching component 108). According to one embodiment, the system 100 and/or engine 104 can include a customization component 112. The customization component 112 can be configured to dynamically alter content displays shown to a user. The content displays delivered by the customization component 112 can be configured to achieve desired outcomes associated with whatever website the current user is interacting.

According to one embodiment, the customization component 112 is configured to generate customized displays, for example, by including displays of a plurality of products linked to a desired user action, wherein the plurality of products are determined based on a matched user model. In one example, search results that would be returned in response to user search terms can be augmented, re-ordered, and/or replaced by the customized displays (having the plurality of products identified and/or ordered based on user/activity modeling) generated by the customization component. In addition, the customized displays can be inserted into or used to present search results determined based on model information and information on content likely to lead to a desired action. For example, advertising banners can be inserted into websites accessed by a user. The advertising banner displays can be determined and/or generated by the customization component 112.

In some examples, the customization component 112 selects products to display based on scores associated with respective products. The scoring for each product can be generated based on historical user actions by the modeling component 108. The historical actions used to score the respective products can be filtered by the matching component 110 so only similar users' activity affects a given score. Each score can also depend on a desired business goal. In the custom product environment, an example business goal can include a custom product purchase. In one example, any actions that lead to a custom product purchase are assigned a respective score and associated with the custom product. The customization component 112 can be configured to select from a plurality of custom products based on highest scores.

According to some embodiments, system 100 can be implemented in conjunction with other services delivered to user populations. For example, system 100 can be implemented as part of a search engine service, an ecommerce site, and a product fabrication site, among other options.

Example Recommendation Environments

Figure 2:
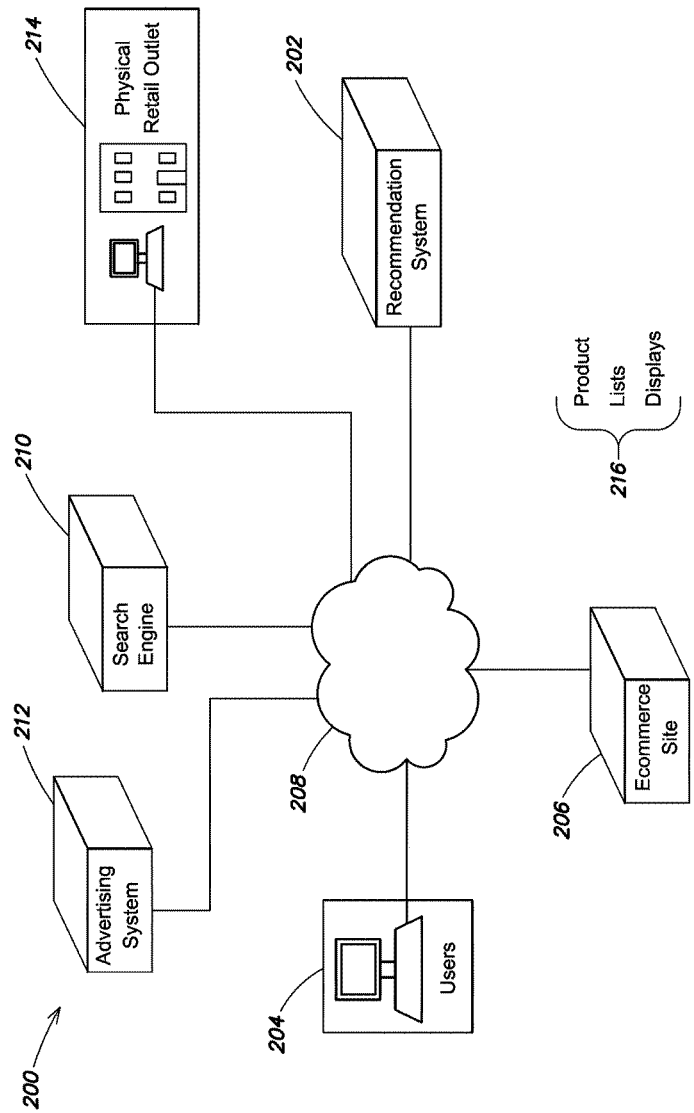
FIG. 2 is a block diagram of a recommendation system in an example environment, according to one embodiment.

FIG. 2 is a block diagram of an example environment 200 in which a recommendation system 202 can be implemented. Users 204 access, for example, online e-commerce sites 206 to purchase goods and/or services. The users 204 are able to access any number of sites via a communication network 208 (e.g., the Internet). The sites can be hosted by a variety of systems (e.g., search engine site hosted by system 210, advertising system 212, among other options).

The recommendation system 202 can be configured to capture information from the on-line sites to associate user behavior with commercially desired actions. As discussed above, the system 202 can use historical data captured from systems 206, 210, and 212 to build user models that associated user behavior with desired action. In some embodiments, the system 202 is configured to implement a point system. User actions on a site are tracked and assigned a point value where the user action leads to a desired result (e.g., a purchase of a product). The point system can be used additively to identify user actions having the most value in terms of accomplishing a result.

In the context of the e-commerce site 206, the system 202 is configured to track user activity, score the user activity as part of a behavior model, and deliver customized results to subsequent users. In one example, the system captures or receives user behavior information over a period of time (e.g., the past 30 days). Similar search patterns (e.g., five users search the e-commerce site for "beach ball") are identified and used to customize search results delivered to subsequent users. For the first user executing the search "beach ball" conventional search results can be displayed (e.g., relevancy ranked results may be displayed). The results will typically include a number of products related to the terms "beach ball." In one example, relevancy ranked results can be displayed with a first product having an identifier (e.g., "54575") first and a second product having a second identifier (e.g., "56711") second in the list of results.

Responsive to user activity, the system 202 can be configured to affect the selection of a pool of results to return and can also be configured to order any results return based on action and/or behavior models on previous users and/or searches. According to some embodiments, system 202 can be configured to identify search results based, at least in part, on behavior models that reflect actions/behavior taken by previous users or based on previous searches. In further embodiments, the system 202 can be configured to order any set of search results based on the behavior models.

In one example, the system links behavior and/or actions to searches and/or the products that are the subject of the search or activity. Subsequent users engaging in similar searches (e.g., identified by the same search terms, similar search terms, etc.), can see the results of the previous behavior, even, for example, where a search result is missing information (e.g., not tagged according to conventional search approaches). In another example, action/behavior based associations can be used by the system to return results based on an entered synonym. In yet another example, a subsequent user can enter an entirely different word (e.g., "comforter" instead of "duvet"), based on activity/behavior modeling the system can still return relevant results based irrespective of the incorrectly entered word (e.g., modeling on user/search activity renders the difference in meaning of "comforter" and "duvet" irrelevant in the generated results).

For example, the system is configured to determine that people who previously searched on "duvets" also interacted with items called/described as "comforters." In some embodiments, the system can learn from tracking user activity associated with search results obtained on "duvets" and tracking subsequent activity where the user interacts with products called/described as "comforters." The system automatically learns the association between duvet and comforter based on user activity and does not need to resort to synonyms tables, dictionaries, etc. The system can be configured to learn such action based associations whenever users interact with digital objects (e.g., search results, product lists, etc.). Further, the system can be configured to display matches for both comforters and duvets even without information defining the two as synonyms. Further embodiments, are configured to minimize language barriers in a similar manner, such that system administrators do not need to tag a product in every language to have the product returned to searches entered in each language. Rather, the system associates previous behavior/actions (e.g., with search terms that lead to the user activity) and based on identifying similar users and/or searches, and the system delivers relevant results irrespective of the meaning of the words entered in to the search. In one example, the associations generated by the system generate language independent models of behavior and return results to searches based on the models.

To provide a hypothetical scenario: of the five users, the system captures search text of "beach ball." One of the five initiates a next level activity towards a product purchase. The one user saves a product having the identifier "56711" to their shopping cart. The search terms "beach ball" are associated with five users by the system. The action "save the product in cart" is likewise stored by the system. The action can also be associated with a score or weight. As the action is a first step in purchasing a product the score or weight can be relatively low compared to an actual purchase. For example, if two users of the five actually purchase the product having the identifier "56711" that activity can be scored relatively higher than the save activity.

If the $4^{th}$ user adds product 54575 to their cart without a purchase the relative scoring based on actual user activity (which can be weighted by level of completion) increases the score for product 54575 but product 56711 will displayed first (e.g., as display 216) in contrast to relevancy ranking of the search results. Product 54575 will be displayed second is the set of results.

In some embodiments, the system 202 can score user activity and augment results based on activity received from respective systems. In other embodiments, the user activity with respect to the ecommerce site can be aggregated and used to optimize results delivered on other systems (e.g., search engine system 210 and advertising system 212). In further embodiments, system 202 can capture or receive information from off-line user activity and incorporate that information into user modeling and scoring. For example, physical retail outlets (e.g., 214) can communicate user behavior information based on completed purchases, store visits, customer inquiries, etc. In some embodiments, information on consumers can be captured via video as well as based on completed purchases.

Although environment 200 illustrates systems 202, 206, 210, and 212 separately, system 202 can be implemented locally on the respective systems to provide optimization/recommendation functions discussed herein. In further embodiments, system 202 can include local components that execute at respective systems 206, 210, and 212. The local components can optimize content displays based on historic user behavior. Further the local components can be configured to communicate user behavior and associated actions to a central repository (e.g., 202). In such an architecture, the local component can provide for augmented or optimized results at respective systems, and the central repository can be used to aggregate and update user models/behavior and activity information for user as the respective systems.

Further user scenarios for environment 200, includes optimizing search results returned by a search engine accessed by users 204. For example, system 210 which hosts the search engine accessible by user 204, can capture user behavior and associate the user behavior with a desired results (e.g., conclude search activity). In one example scenario: over the past 30 days five users type in to a search on a search engine site "beach ball." Of the five users one of the users visits site www.56711.com and views 5 pages within that domain. In the example scenario, the system can be configured to score multiple accesses within a result domain higher relative to a single access to a result domain. Two of the five users view one page within the domain and leave the site. A $4^{th}$ user visits site www.56888.com after entering "beach ball as search terms and viewed 5 pages within that domain. In response to the user behavior associated with search terms "beach ball, the next time a user searches for "beach ball" site www.56711.com will be ranked closer to the top of the search results listed for the search "blue ball" by the system.

In another scenario online advertising campaigns can be optimized to deliver results based on user history. For example, over a period of time (e.g., the previous 30 days) five users type in to a search on a ecommerce site "beach ball"—one of those users saves a product 56711 to their shopping cart, two users purchase product 56711, and the $4^{th}$ user adds product 54575 to their cart without purchasing. The next time a user searches for "beach ball" on the site, an advertising system which can feed recommendations from a recommendation system and/or include a recommendation component (e.g., system 202 and/or engine 104) will generate banner advertisements for display to the user including images of product 56711 as the user continues to browse the internet.

As discussed, the system 202 can analyze "off-line" information to develop user behavior information. For example, in a physical retail location—the system can receive information from in store point of sale systems, internal computer systems, surveillance information, etc. In one embodiment, the system 202 can receive off-line information on the past 30 days: where five males wearing sports jackets between ages of 30-40 shop with the retail store. One of the five picks up product 56711 but does not purchase, two people actual purchase product 56711, and the $4^{th}$ user looks at product 54575 but does not purchase. The system captures the characteristics of the shoppers and can generate user models that can then be used to evaluate a subsequent shopper. For example, the next time a male wearing a sports jacket (or similar jacket) between ages of 30-40 comes into the store, product 56711 will be highlighted with advertising (e.g., on display systems within the store) and/or promoted more throughout the store.

Example Processing

Figure 3:
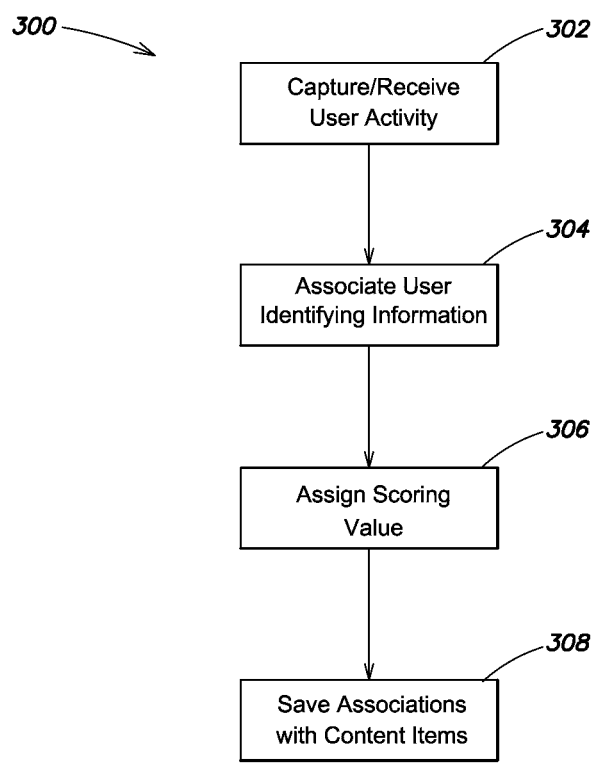
FIG. 3 is an example process flow for scoring historic user activity, according to one embodiment.

Various embodiments of recommendation/customization systems (e.g., 100 and 202) can execute a variety of processes to deliver customized content to users (e.g., shoppers) whether on-line or offline. FIG. 3 illustrates an example process flow 300 for scoring historic user activity. Process 300 begins at 302 with capture or receipt of user activity information. In some settings, process 300 can be executed by a recommendation system that is integrated with an e-commerce site, an advertising system, and/or a search engine system. In such settings, the system can be configured to capture user activity as the users interact with integrated system functions (e.g., purchase products on the e-commerce site, display ad banners, and/or process search queries). The capture or receipt of user activity information at 302 can also include capture or receipt of user specific information. According to some embodiments, whether user activity information is captured or received depends on system architecture. In some examples, local components can capture user activity information directly. In other examples, other systems and/or system elements can directly capture user activity information and communicate such information for processing.

In some embodiments, demographic information on the respective user performing actions can also be captured. In one example, the e-commerce site, advertising site, and/or search engine site can provide for user registration. Registration functions can be used to identify specific users and their respective activity. In addition, registration provides the opportunity to capture demographic information on the user, which can be associated with historical user activity.

Once the respective user is identified, for example, via registration information, that identification information can be captured as the user accesses content, views content, or executes functionality. In some embodiments, the identification information can include demographic information on the user (e.g., male, female, age, education, location, etc.). Additional information that may be captured or received includes: a current display language for a website, user entered information (e.g., age, company name, actual name, search text entered by the user), demographic information, user profile information, user history, user generated information (e.g., content contribution to a website, posted pictures, posted write-ups/text/notes, etc.), location based information (e.g., current geography of user), among other options. In further examples, identification information can include visually captured information on users, including, for example, user facial expressions, type of clothing, environment, etc., all of which may be associated with that user's activity.

In yet other examples, pictures posted of the user can be analyzed to capture user facial expressions, type of clothing, photographed environment, etc. In some embodiments, visual information can be captured from video feeds, in-store cameras, web-cameras, or captured from image information posted by the user.

In some examples, the user activity information and the user identifying information can be captured or received separately and associated at 304. In other examples, the user activity information and identifying information can be captured or received together and saved, for example, at 304. In one example, the user identifying information can be used to generate a user model. Respective user models can be generated to capture common characteristics of users who perform certain actions (e.g., purchase product A, view product A, search on terms "search string," etc.). Each user model can be associated with the respective user activity or multiple activities.

In one embodiment, the system generates a user model that is associated with the respective activities of the users that were used to generate the model. If subsequent users match patterns defined in the model(s), the models can then be used to identify actions likely to be relevant to the subsequent user. Accordingly, customized content can be delivered including highly relevant content.

According to one embodiment, scoring values are assigned to specific activities and/or content items (e.g., a viewed product, search results returned from a query, etc.) each time the specific activity occurs. For example, process 300 can include operations to access scoring rules at 306, and assign a scoring value responsive to identifying a matching user activity.

According to one alternative, the scoring rules assign a weight value to modify actions scores. For example, the system can assign a common score to every action and modify the common score based on weighting of the action. In further alternatives, a common score can be assigned to classes of actions and weighting values used to modify the common scores accordingly.

In some settings, the scoring rules can reflect how close the matched activity is to a desired business goal (e.g., purchase product, add product to cart, complete a review, or conclude search session, among other options). In an ecommerce site setting, a typical goal can include selling a product. The process of purchasing a product can be broken up into steps or levels. For example, to complete a purchase a user must view a product, add the product to a cart, and then complete purchase (e.g., submit payment information). In other embodiments additional steps or levels can be used to describe the process necessary to achieve the business objective (e.g., purchase). Various scoring rules can be implemented to accommodate business objectives having various numbers of steps, with related scoring increasing as a user approaches the business objective. According to one embodiment, each step or level is assigned a score where initial steps are assigned a relatively lesser score than each subsequent step until the business goal is achieved. For example, viewing an object can be assigned a point value of 0.5, adding the object to a purchase cart can be assigned a value of 1.0 point, and executing a purchase 3.0 points. Each step towards purchase can be reflected in a scoring rule. In other embodiments, specific activities can be associated with points directly, regardless of steps or levels of completion.

At 308, any associations and optionally scoring values can be associated with a content item. For example, if a user viewed product A, and viewed and purchased product B, the user information/scoring information can be associated with product A and product B. In some examples, the user information can be incorporated into a user model and the user model associated with product A and product B at 308. In further embodiments, the scoring rules defined an additive scoring system. In one example, as each user performs an activity with respect to a content item, the score for the content item increases. Various content listings can then be augmented, ordered, re-ordered, and/or filtered based on relative scores.

Process 300 can be executed in conjunction with other functions, processes, etc. In some embodiments, scorings and/or association between any two of more of user activity, content score, and user identifying information can be used by a recommendation/customization system to generate customized content displayed to users.

Figure 4:
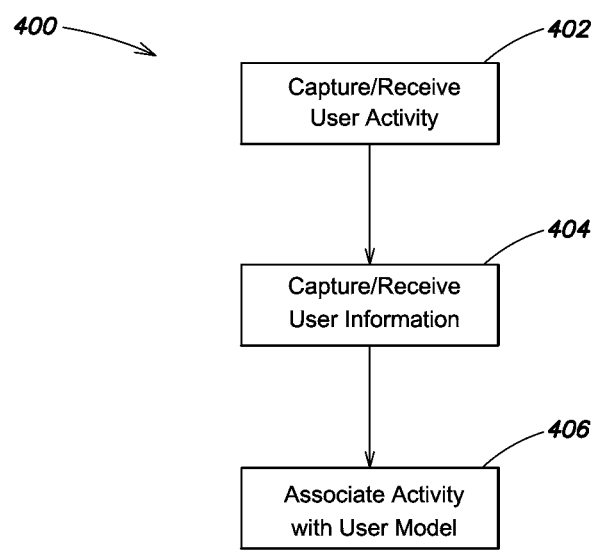
FIG. 4 is an example process flow for generating user models, according to one embodiment.

FIG. 4 is an example process 400 for generating user models. According to one embodiment, process 400 can be executed by a recommendation/customization system (e.g., 100 and 202) to deliver relevant content to an end user. In some examples, the system can execute process 300 and 400 in conjunction, separately, or combine various steps of the respective processes. In further embodiments, the processes 300 and 400 can be executed without need of executing each of the individual steps described. In yet other embodiments, process 300 and/or 400 can be executed by the system to achieve any one or more of: analysis of user activity and/or searches to generate search results to return to subsequent users, to sort search results delivered to subsequent users, and to generate search results with activity based ordering of the search results.

The process 400 begins at 402 with the capture or receipt of user activity. As discussed above, user activity can include on-line interactions with a website (e.g., ecommerce site, search engine site, etc,) and/or off-line activities (e.g., real world store visits). In conjunction, with the capture or receipt of user activity, user indentifying information can be accessed at 404. In some embodiments, a system can capture identifying information directly. In one example, the system can access activity information through activity logs, monitor processes, rewards tracking, purchase tracking, etc. In other embodiments, various systems for monitoring user activity, managing reward programs, etc., can be configured to communicate user identifying information for process at 404.

At 406, user activity and user identifying information is used to generate user models. According to one embodiment, the user models describe characteristics of a subset of a user population who perform the same activity or activities, for example, with respect to viewed content on a web site. One example model: specifies that for users who are male, age between 30-40, and wear a sports jacket, when shopping in a Brand store, products A and/or B are particularly relevant (e.g., users having such characteristics historical purchase or view products A and B over others).

Process 400 can be optional in generation customized content recommendations. In some examples, that a particular user is performing activity in a similar setting (e.g., same website, same language, etc.) can be sufficient to employ any related user history information. Explicit matching to a user model is some settings can be omitted.

Figure 5:
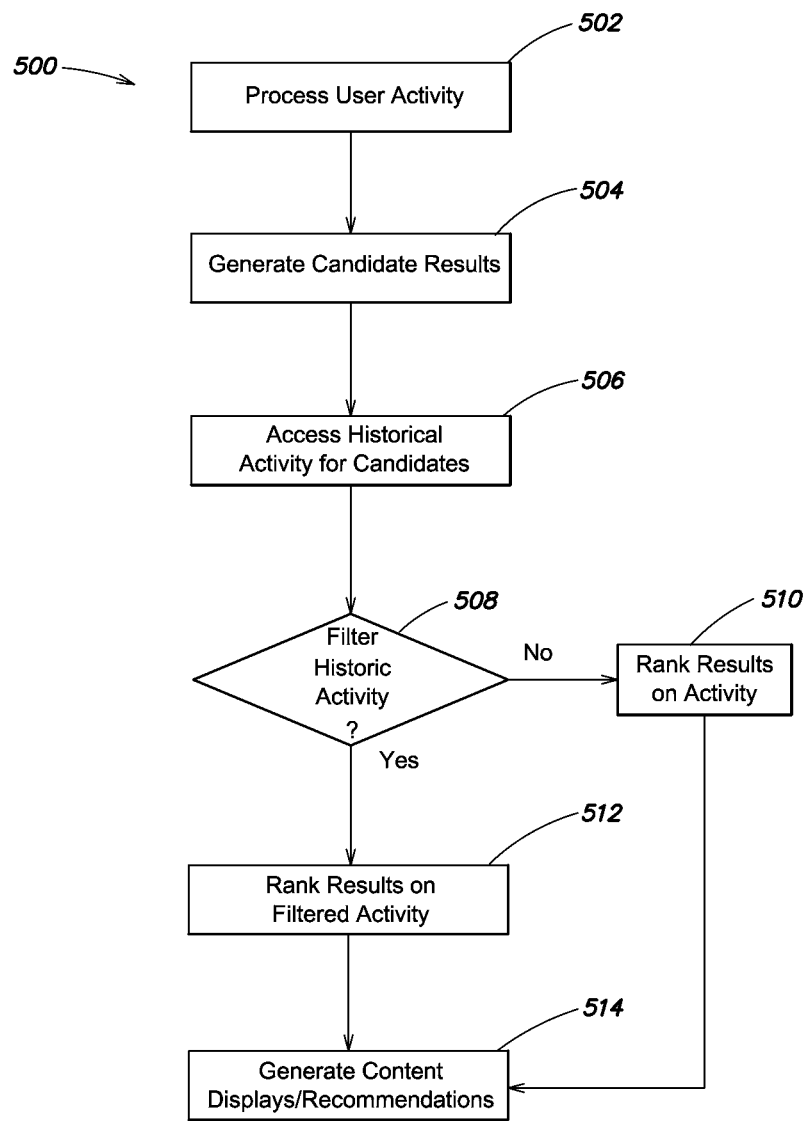
FIG. 5 is an example process flow for generating customized content displays, according to one embodiment.

FIG. 5 is an example process flow 500 for generating customized content for an end-user. The process 500 begins at 502 with processing user activity. For example, the user activity can include specifying images and text to include on a custom product design. In another example, the user activity can include searches executed in a search engine. Responsive to the user activity, candidate results are generated at 504. If the user is creating a custom product, the custom product system can be configured to display a variety of configurations of the design. At 504, the configuration options can be defined as candidates to display to the user. According to one embodiment, the candidates are evaluated to determine their relevancy to the user. At 506, historical activity (e.g., prior user actions associated with respective candidates) associated with the candidates is accessed. The historical activity information can be filtered based on information associated with a current user and information associated with the respective users who performed the historic activity, for example, at 508 YES. In some embodiments, historic activity information can be filtered based on matching a current user and respective identifying information to a user model at 508 YES.

If the activity is filtered, then the candidate results can be ranked based on associated historic activity at 512. In one example, respective historic activity is used to generate scores for respective candidate results. According to some embodiments, scoring rules are accessed to generate the respective scores. In some embodiments, the scoring rules can include the operations discussed below with respect to a search and sort framework. In some examples, the scoring rules can be tailored to specific business objectives (e.g., purchase a product, complete a search, complete a review, etc.). Once scored, the candidate results can then be ordered, ranked, and/or filtered based on their respective score. According to one embodiment, the highest scores reflect candidate items that are the most relevant to the current user in terms of the business objective. Once the candidate results are ordered, customized content displays/recommendations can be presented at 514. In one alternative, if no filtering is used 508 NO, candidate results can be ranked on all available historic user activity at 510. The resulting ordering of candidate results can likewise be used to generate customized content displays/recommendations at 514.

In some embodiments, user models and user activity information can be used to identify links between products, search results, etc. Customized displays, for example, generated at 514, can also include recommendations for related products, based on historical activity. For example, if a user viewed and purchased product A, and then also viewed and purchased product B, the two content items (e.g., product A and product B) can be associated with each other. Responsive to the inclusion of product A or product B in a set of candidate results, either of A or B can be included respectively.

Custom Product Website Example

A customization/recommendation system (e.g. 100, FIG. 1, and 202, FIG. 2) can be implemented in variety of environments. In one example, the system can be implemented in conjunction with a website for designing and/or generating customized products. In particular, the custom product site can feature custom logo creation and integration of custom designs with product templates (e.g., business cards, coffee mugs, t-shirts, novelty items, greeting cards, holiday cards, etc.). One example website is located at web address: freelogoservices.com, which can provide, among other options, interactive user interfaces for generating customized logos and/or text.

According to one embodiment, system 100 can be implemented in conjunction with the site and associated services to provide customized predictions and/or recommendations for logo designs and/or product designs. In one example, the customized predictions/recommendations are generated by the system based on historical user activity on the freelogoservices.com site. For example, the system and/or modeling component 108 can associate business actions (e.g., purchase a custom logo, purchase custom product, save a custom logo to a shopping cart, etc.) with online and/or offline activity for the user population that accesses freelogoservices.com. In some embodiments, users register with the freelogoservices site and provide demographic information that is stored as part of the user's account profile. In some embodiments, respective users' activity on the site can be associated with information on the respective user (e.g., from the account information) performing the activity. In one embodiment, the matching component 110 can determine matches between a current user and the users associated with the historic activity information. The matching component 110 can filter historic activity data based on similarity or matches between the current user and the users performing desired actions. The historic activity can be used to customized recommendations and/or displays present to the current user on freelogoservices.com.

In some embodiments, content items made available on the site (e.g., logo design) are automatically tagged with information on whether users performed actions with respect to the content item (e.g., viewed, added to shopping chart, purchased, etc.). In further embodiments, the tagging can include associations to user information on the users who performed the activity. In some examples, the user information can be stored as part of a "user model" where similarity to the user model is used to determine what historical activity is particularly relevant to a current user.

According to one embodiment, the system can implement a point based methodology for scoring content items available on the site (e.g., custom logos, custom products designs, etc). Each action that is associated with purchasing a good can be assigned a relative score, where scores increase as a user performs activities closer to a final purchase. Scoring may be additive across specific actions and across distinct users. In some examples, the system 100, engine 104, and/or modeling component 108 can score user behavior and associated activity based on adding points to respective content items (e.g., respective products). The content items (e.g., products) with the highest score are identified by the system as having the greatest likelihood of being relevant to a particular user. In some embodiments, the customization component 112 is configured to identify content items to display based on the scores determined by the modeling component which can be tailored and/or filtered based on operation of the matching component 110.

According to one aspect, the system implements a search and recommendation capability that accesses and/or evaluates thousands of logo image template options, billions of search text possibilities, across more than 10 languages. As discussed, the system uses previous user interactions with each logo icon template and/or any text the previous users entered to create a list of logo options. According to one embodiment, the system scores previous user activity based on at least three signals. The three signals can include any one or more of the follow user actions:

(1) logo was saved with text (or without)—this action receives a 1 point weighting according to the scoring rules;

(2) logo was purchased with text (or without)—this action receives a 2 point weighting according to the scoring rules; and (3) logo customized and the user went to an editor with the text—this action receives a 0.5 point weighting according to the scoring rules.

According to one embodiment, the system implements search functionality to access various logo designs/logo icon templates. In one example, the system orders results such that, responsive to search input, candidate results are ordered according to a scoring of respective user history information. For example, if the word "boat" is entered in a search tool, boat styled logos receive the highest point scores and show up first (once enough user history data have been accumulated). In one example, conventional relevancy searching can be implemented and augmented by point based ordering. If there is not enough user history data conventional relevancy ranking of results can be used.

A hypothetic scenario is described to illustrate some aspects of the scoring of logo image templates (or other content items). The hypothetical scenario is not intended to be limiting.

Example User Scenario

Figure 6A:
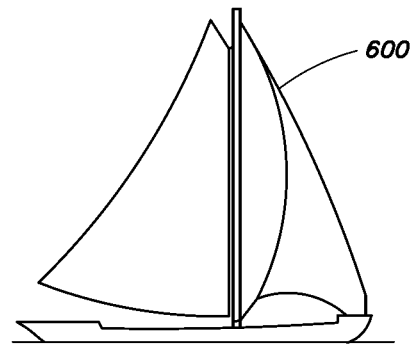
FIG. 6A-B are example logo designs, according to one embodiment.

User 1: types "boat" in a text input box for type of logo, selects, and saves the logo picture template, 600, FIG. 6A. In response to the user's activity, the logo 600 is associated with user information for the user who selected 600, the text input used to describe the logo "boat," and can further be assigned a point value for the action, for example, based on scoring rules. In this hypothetical, the logo 600 is assigned 1 point.

User 2: types "boat," designs and purchases logo 600, FIG. 6A. In response to the user's activity, the logo 600 is associated with user information for the user who selected 600 (e.g., user 2), the text input used to describe the logo "boat," and can further be assigned a point value for the action, for example, based on scoring rules. In this hypothetical, the logo 600 is assigned 2 points based on the purchase activity.

Figure 6B:
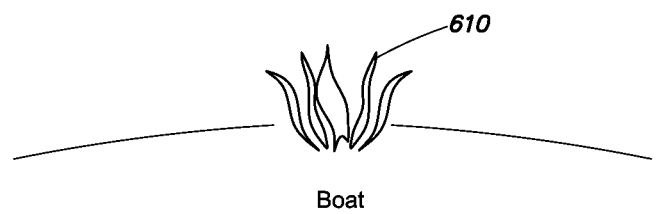

User 3: types "boat," designs and saves logo 610, FIG. 6B. In response to the user's activity, the logo 610 is associated with user information for the user who selected 610 (e.g., user 3), the text input used to describe the logo "boat," and can further be assigned a point value for the action, for example, based on scoring rules. In this hypothetical, the logo 610 is assigned 1 points based on the saving of the logo.

User 4: types "boat," designs a logo, but does not save the logo 610. In response to the user's activity, the logo 610 can be associated with user information for the user who selected 610 (e.g., user 4), the text input used to describe the logo "boat," and can further be assigned a point value for the action, for example, based on scoring rules. In this hypothetical, the logo 610 is assigned 0.5 points based on the design activity.

User 5: types "boat," designs logo 610, but does not save it. In response to the user's activity, the logo 610 can be associated with user information for the user who selected 610 (e.g., user 5), the text input used to describe the logo "boat," and can further be assigned a point value for the action, for example, based on scoring rules. In this hypothetical, the logo 610 is assigned 0.5 points based on the design activity.

User 6: types "boat," designs logo 610, but does not save it—0.5 points are assigned to the logo 610. User 7: types "boat," designs logo 610, but does not save it—0.5 points are assigned to the logo 610. User 8: types "boat," designs and saves logo 610—1.0 point is assigned to logo 610. At the conclusion of the eight user's activity logo 600 has 3 points, and logo 610 has 4 points. In response to the next search on "boat," the logo 610 is displayed first, and logo 600 displayed second. This result is in contrast to conventional methodologies, which would return images that include boats in response to a search for "boat" logos. Although logo 610 includes text "boat", the image returned as the highest ranked result resembles a floral pattern. According to one embodiment, the current system does not require any understanding of the meaning of the text being search on, but rather uses historical user activity to identify relevant search results. According to other embodiments, such meaning agnostic approaches can be used across multiple languages seamlessly, whereas conventional meaning based approaches can fail, due to the complexity of translation and nuance of multiple languages.

In some settings, the system is configured to provide search capabilities that are implemented across multiple languages. As discussed, the need to handle multiple languages can overwhelm conventional recommendation approaches. In contrast, the system (e.g., 100) can adapt predictive recommendations to any language in which the site is rendered. In some embodiments, the system is configured to automatically capture an entire search string as it is entered, and associate the entire search string with subsequent user activity (e.g., view product A, purchased product B). Each action can be scored based on a desired business goal to further customize the selection of relevant logos to display, which can be reflected in scoring rules.

Additionally, the language being used for displaying the site can also be captured and associated with any search string, and/or the subsequent action. In one embodiment, by filtering historic activity based on a current display language (e.g., language displayed to the current user), the language element can be eliminated from consideration. The meaning of individual terms within the search string can likewise be discounted. In some embodiments, matches on the same or similar search strings within the custom product site are presumed to have similar meaning and/or context—allowing the system to handle custom recommendations across multitudes of languages without requiring explicit understanding of the individual search terms. For example, historic user activity can be used to score logo design options. The historic activity can be filtered on a current language, and in some embodiments on matching characteristics between the current user and the users who generated the historic activity. For example, user characteristics and historical user activity can be associated with logo designs available on freelogoservices.com. In further examples, a score can also be associated with the logo designs. The system can then present the highest scored logo designs based on matching user characteristics and/or previous user activity.

As discussed above, further refinements of the scoring approaches can include filtering of historical activity to include current user characteristics, and/or characteristic of the user who generated the historical activity. In some embodiments, historical user activity for users who do not match a current user can still be used in determining score. For example, the scoring rules can be applied to the unmatched activity, and in one example, discounted. In one alternative, different scoring rules can be applied to unmatched activity.

Other embodiments can include scoring rules with relative scoring of user activity based on a level of completion towards a business goal associated, for example, with a web site. For example, freelogoservices.com can be organized as a series of steps or levels necessary to purchase a custom product (e.g., a logo design). Level 1 can include actions necessary to design a logo. Level 2 can include saving a potential design. Level three can include adding the design into a shopping cart, and level 4 can include the actual purchase of the design/products having the design. Each level can be assigned scoring values the increases as a user would get closer to an actual purchase.

In a search engine setting, the level may reflect entry of search terms, selection of a search results, and conclusion of a search session. In one example, conclusion of the search session can be the business goal. Identifying the conclusion of a search session can include determining that the user concluded the search based on subsequent user actions (e.g., based on exiting the search functionality, user does not return to search results, user does not refine search, etc.). Other action levels can include multiple accesses to a particular domain of a search result site. In one example, a single access to a domain of a search result can be scored with a level, while multiple accesses are scored as another level towards a completed search session. In other embodiments, scoring rules can be implemented without levels, and specific actions given respective scores.

Returning to the freelogoservices.com example, the website can be designed to facilitate the purchase of a custom product (e.g., a custom logo design). For some embodiments, the site can be configured to display to each user a plurality (e.g., 20-30) of logos that are highly relevant (based on user activity scoring) to what a user is looking to create on the freelogoservices site. Thus, the system can be configured to execute search capabilities that can display the right subset of logos out of 1000's of potential logo options for each user.

According to some embodiments, the freelogoservices.com site provides access to thousands if not millions of potential logo designs. The system can be configured to narrow thousands/millions of options to a relevant subset of 10-30 logos, responsive to previous user activity. The previous user activity can include any one or more of input of: a logo category, logo text, logo type, among other options. Accordingly, the system can be configured to narrow millions of options to a relevant subset of 10-30 logos. In some embodiments, the system 100, engine 104, and/or modeling component 108 includes scoring rules specific to content items provided on freelogoservices.com (e.g., logo designs). According to some embodiments, scoring rules can be specifically tailored to a respective web site on which they are implemented. For example, search engine rules can vary from scoring rules for a product purchase site, or an advertising delivery service.

Search Site Example

A customization/recommendation system (e.g. 100, FIG. 1, and 202, FIG. 2) can be implemented in variety of environments. In one example, the system can be implemented in conjunction with a website for executing search functionality. The search functionality can include searching on products for purchase and/or digital content items (e.g., online resource, articles, information, etc.).

According to one embodiment, system 100 can be implemented in conjunction with the website and associated services to provide customized predictions and/or recommendations for search results and/or additional recommendations delivered in conjunction with search results. In one example, the customized predictions-recommendations are generated by the system based on historical user activity on the accessed website. For example, the system and/or modeling component 108 can associate business actions (e.g., purchase a product, enter search terms and add a result to a shopping cart, enter search terms and conclude search session, execute search and add descriptive information to a result, etc.) with online and/or offline activity for the user population that accesses the website. In some embodiments, users register with the website and provide demographic information. In one example, the demographic information can be stored as part of a user's account profile. In some embodiments, respective users' activity on the site can be associated with information on the respective user (e.g., from the user's account information) performing the activity.

In one embodiment, the matching component 110 can determine matches between a current user and the users associated with the historic activity information. The matching component 110 can filter historic activity data based on similarity or matches between the current user and the users performing desired actions. The historic activity (e.g., filtered and unfiltered) can be used to customize recommendations and/or displays presented to the current user on the website. For example, the search results can be customized and/or additional suggestions can be presented. In one embodiment, the historic activity is used by the system to score user actions, score search results, etc., and the customized and/or additional suggestions can be presented based on respective scoring.

In some embodiments, content items made available on the website are automatically tagged with information on whether users performed actions with respect to the content item (e.g., viewed, entered search terms, selected a result for review, added to a shopping cart, purchased, concluded a search session, etc.). In further embodiments, the tagging can include associations to user information on the users who performed the activity. In some examples, the user information can be stored as part of a "user model" where similarity to the user model is used to determine what historical activity is particularly relevant to a current user.

According to one embodiment, the system can implement a point based methodology for scoring content items available on the site (e.g., search results, matching products, etc). Each action that is associated with a content item good can be assigned a relative score, where scores increase as a user performs activities closer to a defined goal (e.g., product purchase, conclude search, etc). Scoring may be additive across specific actions and across distinct users. In some examples, the system 100, engine 104, and/or modeling component 108 can score user behavior and associated activity based on adding points to respective content items (e.g., respective products and/or search results). The content items (e.g., products) with the highest score are identified by the system as having the greatest likelihood of being relevant to a particular user. In some embodiments, the customization component 112 is configured to identify content items to display based on the scores determined by the modeling component which can be tailored and/or filtered based on operation of the matching component 110.

According to one aspect, the system implements a search and recommendation capability that accesses and/or evaluates hundreds of thousands of content items, billions of search text possibilities, across more than 10 languages. As discussed, the system uses previous user interactions with each content item and/or any text the previous users entered to create a list of search result options.

According to one embodiment, the system does not require any understanding of the meaning of the text being search on, but rather uses historical user activity to identify relevant search results. According to other embodiments, such meaning agnostic approaches can be used across multiple languages seamlessly, whereas conventional meaning based approaches can fail, due to the complexity of translation and nuance of multiple languages.

In some settings, the system is configured to provide search capabilities that are implemented across multiple languages. As discussed, the need to handle multiple languages can overwhelm conventional recommendation approaches. In contrast, the system (e.g., 100) can adapt predictive recommendations to any language in which the site is rendered. In some embodiments, the system is configured to automatically capture an entire search string as it is entered, and associate the entire search string with subsequent user activity (e.g., view product A, purchased product B, conclude search session). Each action can be scored based on a desired business goal to further customize the selection of relevant content items to display—which can be reflected in scoring rules.

Additionally, the language being used for displaying the website can also be captured and associated with any search string, and/or the subsequent action. In one embodiment, by filtering historic activity based on a current display language (e.g., language displayed to the current user), the language element can be eliminated from consideration. The meaning of individual terms within the search string can likewise be discounted. In some embodiments, matches on the same or similar search strings within the web site are presumed to have similar meaning and/or context—allowing the system to handle custom recommendations across multitudes of languages without requiring explicit understanding of the individual search terms. For example, historic user activity can be used to score search result options. The historic activity can be filtered on a current language, and in some embodiments on matching characteristics between the current user and the users who generated the historic activity. For example, user characteristics and historical user activity can be associated with the search result options available on the website. The system can then present the highest scored search result options based on matching user characteristics and/or previous user activity.

As discussed above, further refinements of the scoring approaches can include filtering of historical activity to include current user characteristics, and/or characteristic of the user who generated the historical activity. In some embodiments, historical user activity for users who do not match a current user can still be used in determining score. For example, the scoring rules can be applied to the unmatched activity, and in one example, discounted. In one alternative, different scoring rules can be applied to unmatched activity.

Other embodiments can include scoring rules with relative scoring of user activity based on a level of completion towards a business goal associated, for example, with a web site. In a search engine setting, the level may reflect entry of search terms, selection of a search results, and conclusion of a search session, among other options. In one example, conclusion of the search session can be the business goal. Identifying the conclusion of a search session can include determining that the user concluded the search based on subsequent user actions (e.g., based on exiting the search functionality, user does not return to search results, user does not refine search, purchases one of the search results, views one of the search results, etc.). Other action levels can include multiple accesses to a particular domain of a search result site. In one example, a single access to a domain of a search result can be scored with a level, while multiple accesses are scored as another level towards a completed search session. In other embodiments, scoring rules can be implemented without levels, and specific actions given respective scores.

According to some embodiments, scoring rules can be specifically tailored to a respective web site on which they are implemented. For example, search engine rules can vary from scoring rules for a product purchase site, or an advertising delivery service.

Search and Sort Framework Embodiments

According to some aspects, the system can score and deliver customized recommendations based on a search and sort framework that can be applied across multiple environments. For example, any website which allows users to search and retrieve results can be integrated into and/or executed in conjunction with the recommendation system.

According to one embodiment, information about search content can be classified based on the type of information that is available. The types of information can be classified according to the basis of the available information. Further, the classified information can be used by the system to drive search and sort functionality provided to users. According to some embodiments, information about searched items (e.g., content items, custom products, logo designs, etc.) can be used in conjunction with any information about user's interest, (e.g., user entered search terms, user custom text, user entered properties, user defined properties, etc,) associated with the searched items, and optionally, information about user classification of the searches items or non-selected properties (e.g., acquisition channel, number of visits, activity off-site (e.g., browser trail or internet history), etc.) to implement a search and/or sort framework for a recommendation/customization system (e.g., 100).

Shown in FIG. 17 is an example data model used by the system to implement a search and sort framework. The search and sort framework can include at least three classifications of data available on searchable content. Information can be classified, indexed, and/or stored according to a respective classification. The classifications can include a type: "Standard" at 1702, which can be associated with information about searchable content/items. In one example, standard information includes information that is provided with the searchable content/items when listed. In one example, products available for purchase are made searchable in an on-line interface which can be presented on an ecommerce site. The information provided in conjunction with the products (e.g., product name, product description, product price, etc.) are indexed as standard data items.

In one embodiment, the standard data items can include a number of data elements that describe the data item. In one example, the data elements for standard data items can include tags (e.g., 1704) existing when the product is made searchable, name, (e.g. 1706), description (e.g., 1708), properties (e.g., 1710). According to some embodiments, a variety of properties can be defined on searchable objects including, for example, text categories, for images, size, color, etc., and can also include free text properties or pre-defined properties.

In one embodiment, standard data can include static information about search items which can be indexed and/or saved in a search knowledge base. For example, the static information can include known text fields that describe the content item. The static information or known text fields can include product descriptions, item name, item description, and item properties. For example, in a custom product environment, static information can be associated with a data type: "standard." The standard data type can be configured to accommodate data fields provided with any content item (e.g., custom product, online product, product search result, etc.). In one example, a product for sale on-line will include a number of standard data fields. For example, product name, product description, and product properties.

Another classification of data that can be made available in a searchable knowledge base includes user entered information. In the course of searching for a specific content item (e.g., a desired search result, a desired product, an image, etc.) a user will enter information (e.g., search terms), interact with search options, and/or provide information that allows the user to narrow a set of search results returned for their review. In one embodiment, the information entered by the user is tracked by the system and captured as information about user interests. Shown in FIG. 17 at 1712 is an example data category for capturing and organizing data elements regarding user interest and/or data elements for capturing and organizing data elements regarding self reported user interest information. The data elements can include, for example, search query information (e.g., 1714), which can be stored text input, search navigation selections, facet selections (data facets can include descriptive information regarding a searchable object, search result, etc.), user custom text (e.g., 1716—where a user creates text associated with an object), user entered properties for the searchable item (e.g., 1718—where the user creates a descriptive property for the searchable item). The user entered properties can be captured and/or saved as text including, for example, a company name, logo text created by the user, interests associated with the user entered by the user, among other options.

Shown at 1720 is another classification for information about a user, user classification information, or non-selected properties. In one embodiment, information about users, classifications, or non-selected properties can be captured and organized as a user demographic data type (e.g., 1722). The user demographic data type can include a number of data elements. For example, the demographic data type can include display language (e.g., 1724—browser display language), user language (e.g., user preference information on language), country (e.g., at 1726), and current location. Other examples can include an acquisition channel data element, which can be associated with the user accessing a site or set of search results (e.g., at 1728—where an originating site-advertisement is credited for delivering a user), an activity data element (e.g., 1730) which can be associated with a number of visits to a particular site, and an activity off-site data element (e.g., 1732) which can be associated with visit to other websites and site visits/preferences that characterize a user.

According to one embodiment, each data element and/or each data category can also be associated with user activity related to search items (e.g., at 1734). For example, user activity can be tracked for each search item, content item, etc., and linked to respective data elements. The user activity (e.g., user actions on results returned to a user query, additional search terms entered, user selection of a result, and/or on-line navigation to view a product/content item, user action to add a product to cart, purchase a product, access a specific search result, etc.) can be associated with the categories of information or data elements described above, and further used by the system to execute a search and sort framework for providing customized result sets responsive to user search activity.

In some embodiments, the search and sort framework is used to customize delivery of a set of search results. In one example, the search and sort framework is implemented within an ecommerce site to return products and/or recommendations for purchase responsive to user activity within the ecommerce site. In another example, a pool of potential matches can be determined based on matching data elements within the data categories (e.g., standard, user entered, and user demographics) responsive to search activity by a user. Optionally, in some embodiments, specific data elements can be prioritized for matching and/or for presenting results. Once the data pool of matching objects is identified, the pool of matching objects can be sorted. According to one embodiment, the pool of matching objects is sorted by assigning a sort score to objects within the pool of matching objects.

A variety of sort scoring rules can be implemented by various embodiments. In one example, a sort score can be generated based on data elements associated with each item in a pool of matching objects. Each element can have a respective score, which can be modified by a weight. For each object the respective elements score modified by their respective weights can be combined (e.g., added) to obtain a total sort score for the object. In one example, the sort score is calculated based on each individual element score multiplied by their weights and then combined into a total sort score.

The scoring rules can reflect a plurality of scoring methods. For example, some conventional scoring (e.g., relevancy based search score) approaches can be implemented as part of delivering customized search results. According to some embodiments, the scoring rules may include scoring on occurrences where, for example, a search keyword exists in a % of returned items, or by density, wherein a search keyword exists as a % of the words describing a particular item. Scoring may also include activity based scoring. In some embodiments, activity based scoring can be used alone to filter and/or sort customized search results. In other embodiments, activity based scoring can be used in conjunction with conventional approaches.

According to one embodiment, activity based scoring includes scoring items within a pool of results based on numbers of activity occurrence. For example, where the activity is numbers of clicks, each item within a result pool will be evaluated on the number of click(s) each item received (e.g., item 1 clicked 3 times, item 2 clicked 1 time, item 3 clicked 0 times, etc. within the pool of results) to establish activity occurrence.

Figure 18:
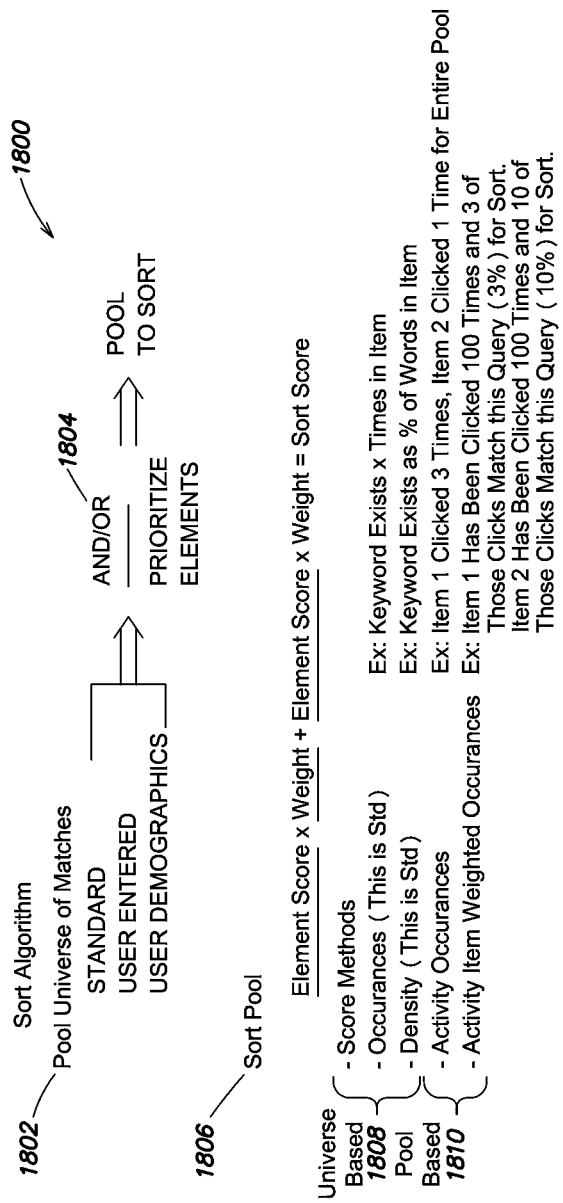
FIG. 18 is a process flow for generating and sorting search results according to one embodiment.

Additional activity scoring can be based on activity weighted occurrences. In one embodiment, activity item weighted occurrences can be determined by analyzing the number of times a specific activity has occurred, based on matching search activity (e.g., query). For example, item 1 can be scored based on having been clicked 100 times where 3 of those click actions match the query entered by the current user (e.g., returning a weighted activity score of 3%), and an item 2 has been clicked 100 times with 10 of those click matching the query entered by the current user (e.g, returning a weighted activity score of 10%). Any user activity can be captured (e.g., add to shopping cart, purchase, view, click, select (e.g., review additional detail on a product in a user interface), sub-select (e.g., review additional detail in a second user interface screen accessed through a first product display screen), etc.) with respective to content items and scored using activity based scoring and/or FIG. 18 shows an example process flow and data elements analyzed 1800, according to one embodiment. Responsive to search activity by a current user a pool of matches is generated from the universe of potential content that may be returned. In one example, the universe of potential matches includes all unfiltered data accessible by the system. For example, the universe of potential matches can include all the products stored in a products database. At 1802, a pool of potential results is generated based on matching the current user's search activity (e.g., user entered search terms) to the available data. In one example, content items are analyzed to and filtered on matches within any types of data associated with the content items (e.g., standard, user entered, and/or user demographic). In some embodiments, various data elements can be prioritized (e.g., at 1804). The prioritized data elements can be used by the system to filter a pool of results which are then sorted for presentation to the current user. At 1806, one example sort algorithm is illustrated (e.g., element score×weight+element score×weight). A sort score for each item is calculated. In one example, the sort score can be determined based on a contribution of conventional scoring methodologies (e.g., occurrences and/or density at 1808) and activity based scoring (e.g., activity occurrences and/or activity item weighted occurrences at 1810). Each element of the score can be weighted differently depending on preference. In some embodiments, activity based scores are heavily weighted to favor user activity.

Example User Interface and Example Flows

In one embodiment, the freelogoservices site can be configured with a step based approach to purchasing a custom product/creating a logo design. In the first step the user can provide descriptive information on the custom product they wish to create. For example, various text input fields can be presented to elicit information on a logo the current user wishes to design. Shown in FIG. 7A is an example user interface 700 that can be accessed to begin creation and purchase of a custom logo. The user may specify a logo category (e.g., 702), text to include with the logo (e.g., 704), and a type of logo they wish to create (e.g., 706, FIG. 7A). The interface can be configured to accept multiple lines of logo text (e.g., 708). In some embodiments, the user is prompted to input their name (e.g., first and last 710-712). Other user information can be required, country 714, e-mail 716, and phone 718. In one example, by default the logo category is selected as "other" to provide access to all available logos. In one alternative, the logo category field can be blank where a user has not selected a category. Once the user has input required information, the user may select 720 "Choose a Design" to move to the next step of the design process.

According to one embodiment, the user's selections can be captured by system (for example, in FIGS. 7A-8) and the system can be configured to generate a query based on the user's selections. In one embodiment, the search results can be returned as candidate product selections, where the candidate product selections are ordered according to an activity score (for example, generated as part of execution of the search and sort framework discussed above).

Figure 7B:

In some embodiments, the user interfaces may vary based on whether a new user is creating a logo (e.g., FIG. 7A) or a returning user is creating a logo (e.g., user interface 750 of FIG. 7B). Returning users can be provided header displays for navigating within the freelogoservices site (e.g., at 752). The header 752 can identify the current user "Matt," any available saved products (e.g., "Saved Logos and Cards (7)), and other functions accessible on the site: Create a Logo, Create a Business Card, Your Account—for defining account information and user profile information, Help, and sign out functions, among other options. User interface 750 can also include a status display 754 reflecting steps for completing a purchase of a custom logo. According to one embodiment status display 754 can include a progress bar showing each step: "1. Logo Text," "2. Choose Design," "3. Colors & Fonts," and "4. Save & Download." According to one embodiment, user activity within each step can be scored according to the step in which the activity occurred. Highlights within the status bar can be configured to reflect a current step or level (e.g., at 756). Page listing information can also be configured to reflect a status for creating the custom logo (e.g., 758). At 760, information for the logo the user wishes to create can be input (e.g., logo category, first line of logo text, second ling of logo text, and type of logo, among other options). Once input, the user may process by selecting 762 "Choose a Design."

Figure 8:
FIG. 8 is a screen capture of an example user interface, according to one embodiment.

Alternatively, user may access account information by selecting "Your Account" in the header bar 752. FIG. 8 is an example user interface 800 for managing account information. Users can enter, manage, and/or change their account information at 802. For example, users may specify: a default logo type, first name, last name, email, password, confirm password, discount code, company name, country, city, state, zip, phone, mobile phone, among other options. Any changes can be saved by selecting 804. Upon saving changes, the user can be re-directed to whatever page they were previously accessing. Alternatively, a user may select functions from the header display of 800 (e.g., at 805) to return to logo design functions.

Figure 9A:
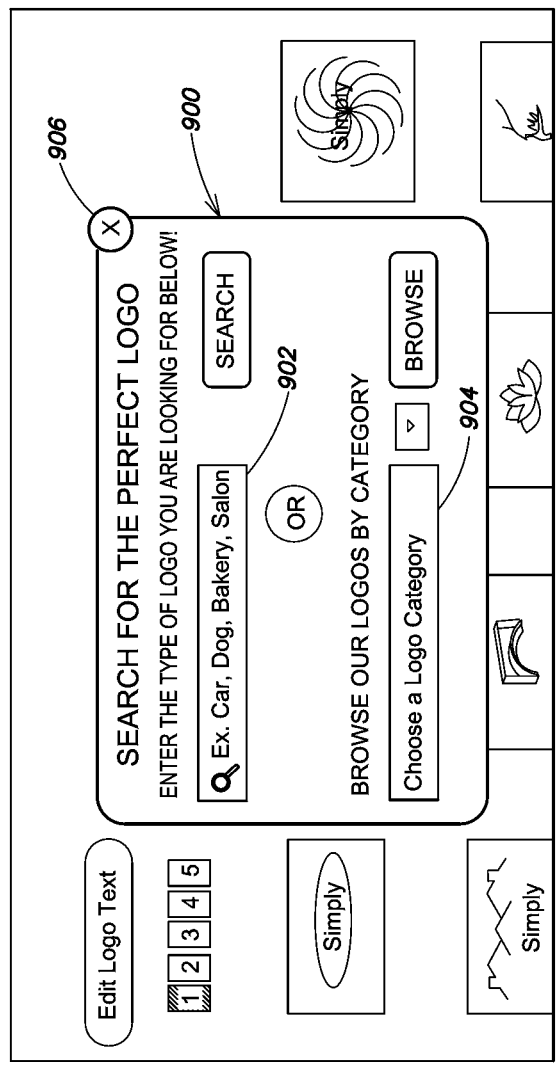
FIG. 9A is a screen capture of an example user interface, according to one embodiment.

Returning to FIG. 7B, once the user selects 762, the system transitions to a next step of the logo design process. In one example, the system provides an overlay display to prompt the user to further define their needs for a custom logo. Shown in FIG. 9A is an example user interface 900 that can be displayed over a design interface (e.g. FIG. 9B). In one example, UI 900 is displayed when the user has not specified a logo category or logo type they would like to create. At 902, the user can input a logo type which the system uses to search existing logos or at 904 a logo category can be selected from a drop down list. The drop down list can include pre-defined categories. In some embodiments, user activity can be used by the system to automatically generate new logo categories. The new categories can be selected from the drop down menu 904 once generated by the system. If the user has specified a logo category (e.g., at 904) or a logo type or closes UI 900 (e.g., at 906), the system displays user interface 950 of FIG. 9B. For the purposes of clarity, the common elements between the various user interfaces may not be described with respect to each Figure.

Figure 9B:
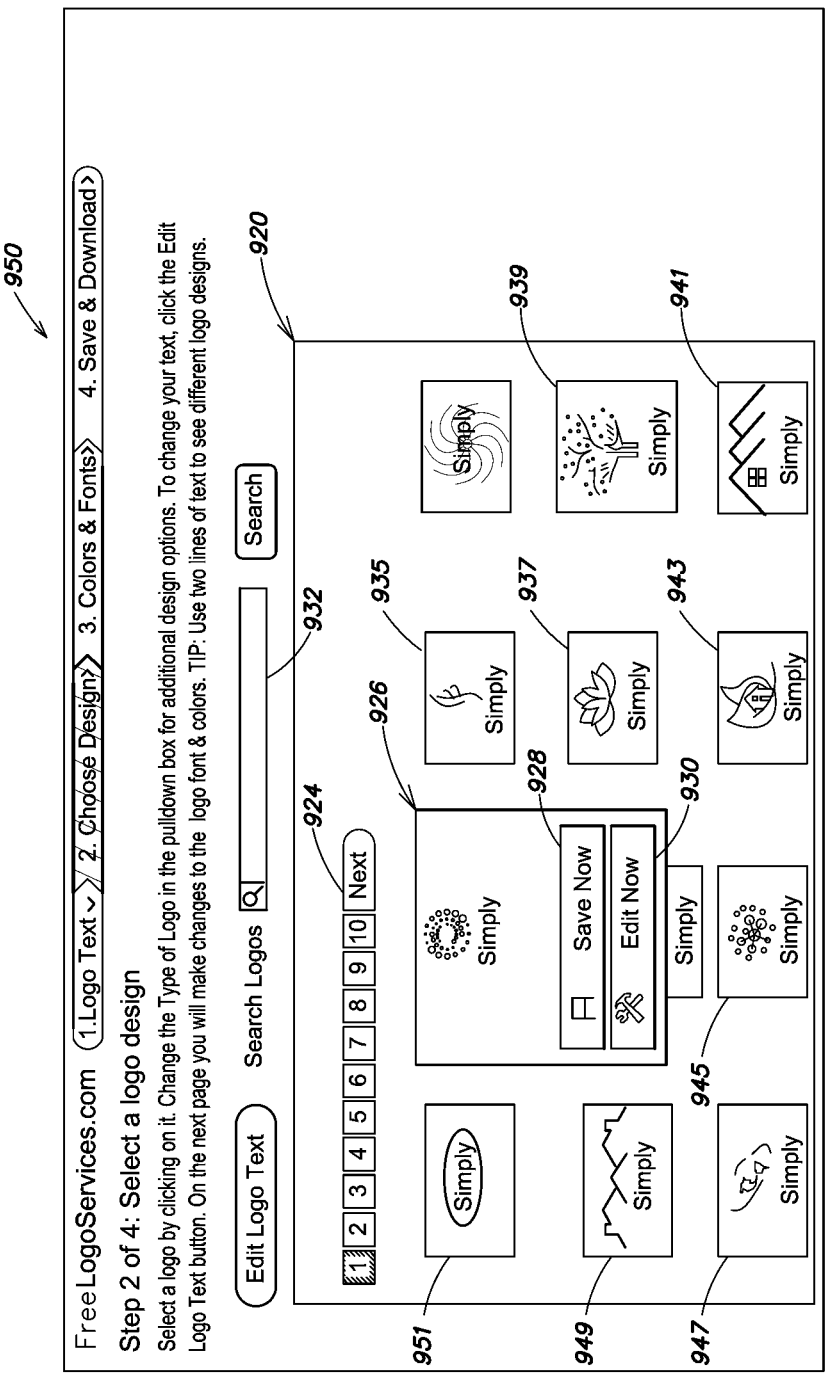
FIG. 9B is a screen capture of an example user interface, according to one embodiment.
Figure 10:
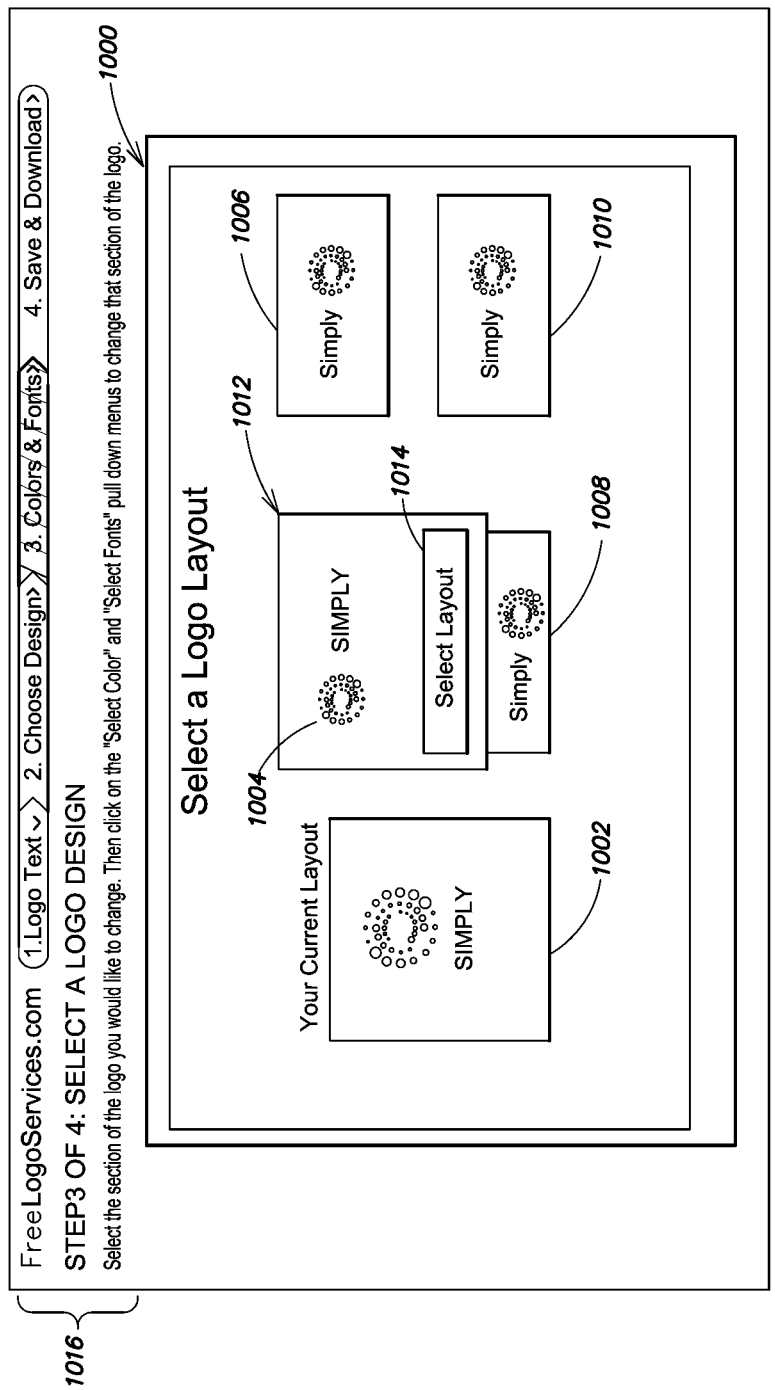
FIG. 10 is a screen capture of an example user interface, according to one embodiment.

Shown in FIG. 9B is a user interface 920 for selecting a respective design. User interface 920 can include a selection display section 920 for rendering candidate designs. Multiple pages of design options may be available, which can be accessed by selecting page links or next at 924. Additionally, the user may filter the displayed logo options by entering search terms in input box 932.

In one embodiment, UI 920 is responsive to a hover action by users. For example, if a user places a mouse pointer over a particular design option, that design option will be rendered with a selection/edit border 926. Within the border 926, the user may select "Save Now" at 928, which results in the system saving the logo design and transition the user to purchase displays. Alternatively, the user can select "Edit Now" at 930 to access design editing functions.

Not readily apparent, each action taken by the user can be stored, for example, on the system hosting freelogoservices.com. The user actions, user information, and optionally scores for the action can be associated with the logo being designed, as well as any logo text, or logo search terms entered. As discussed above, the accumulation of user actions can be used to influence subsequent displays of logo designs.

For example, the options displayed at 935-951 can be generated as candidate search results by the system. Each candidate search results can include a respective search/sort score developed as part of the execution of the search and sort framework discussed above. The ordering of the potential logos can be dependent on a respective search/score.

According to one embodiment, responsive to selection of 930, the system can display an overlay screen 1000. The overlay screen 1000 can be configured to present layout options to the user. Each layout option can be ordered similarly to logo design ordering (e.g., respective search/sort scores can be used to identify options for display). In one example, user historical selection of similar logos and/or text can be used to determine what layout options should be presented to the user (e.g., prior selections of logos increase their respective search/sort score). Layout options can be scored using historical user activity, as discussed above, and ordered based on a respective score. In other examples, historical user activity associated with layout options can be filtered based on using models/characteristics matching the current context (e.g., entered search terms and/or user profile matches) to further refine any ordering of selections. At 1002, a current layout is presented to the user based on logo design selections made in previous screens. Additional layout options can be displayed at 1004-1010. Each layout option can be responsive to a hover action by a user. If the user moves a pointer on the display over the layout option, a selection border will be displayed (e.g., at 1012). Responsive to selection of the selected layout (e.g., at 1014), the system transitions to an editing user interface. In some embodiments, overlay screen 1000 is displayed over a grey out background 1016. The grayed out background 1016 can reflect what will be shown to the user as the editing interface upon selection of layout.

Figure 11:
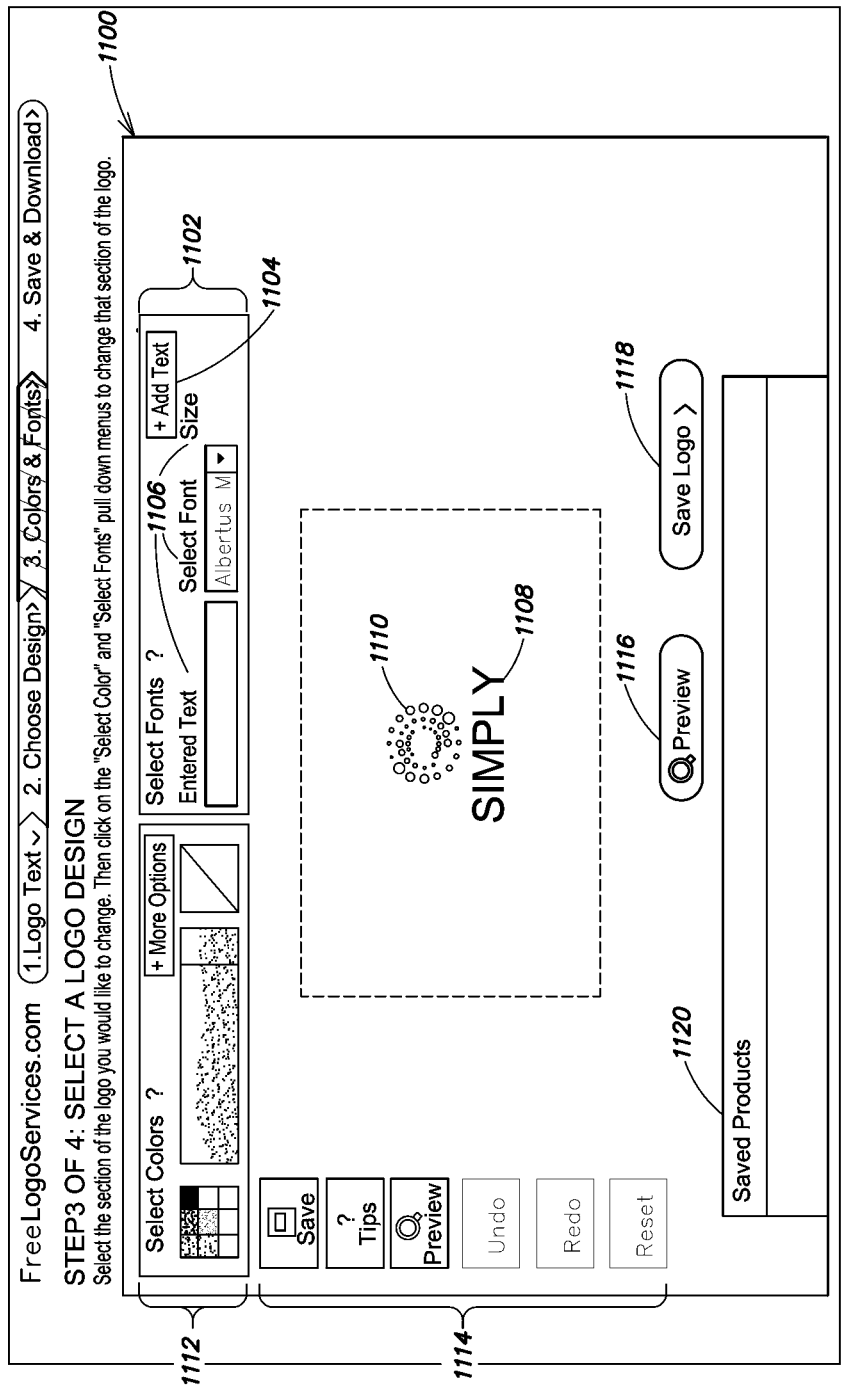
FIG. 11 is a screen capture of an example user interface, according to one embodiment.

FIG. 11 is an example screen capture of an editing user interface 1100. The editing UI can include text management tools (e.g., at 1102). The text management tools can provide for adding new text (e.g., at 1104), manipulating text characteristics (e.g., font, size etc. at 1106). The text management tools can be configured to manipulate the exiting text "SIMPLY" at 1108. The editing UI can also include color management tools (e.g., at 1112). The color management tools can be configured to manipulate the display colors of any text in the logo design, as well as the colors presented in a logo image (e.g., at 1110). The color management tools can also include selections configured to provide additional functionality. In one example, the additional functionality can provide for popular color selections. In some embodiments popular color selections can be presented based on scoring of prior user selections.

At 1114, display 1100 includes file management functions. The file management functions provide for saving a design, accessing design tips, accessing a preview image, undoing edits, redoing edits, and resetting a logo to original format, among other options. Additionally, a user can access a preview of their design responsive to selection of 1116. The system saves any edit to the logo design responsive to selection of 1118 in interface 1100. According to one embodiment, any saved products that a user has designed, saved, and/or purchased can be displayed as part of the editing screen 1100. For example, at 1120, images of previously saved logo designs can be displayed. Additionally, recommendations for products (e.g., novelty items, coffee mugs, hats, t-shirts, etc.) incorporating the current logo design and/or prior logo designs can be displayed within the saved products display area 1120. Not shown, the saved products display area can include functions for purchasing the displayed product or logo as well as functions to edit the displayed product or logo. In some embodiments, each of the displayed products and/or logos can also be scored based on prior user interactions as discussed above, for example, with respect to content items and logo designs.

In some embodiments, selection of save logo at 1118 triggers the system to display a preview of the logo design. The preview window requests that the user confirm the layout of the logo design prior to saving. If the user is satisfied (e.g., selects save in the preview display), the system saves the logo.

Figure 12:
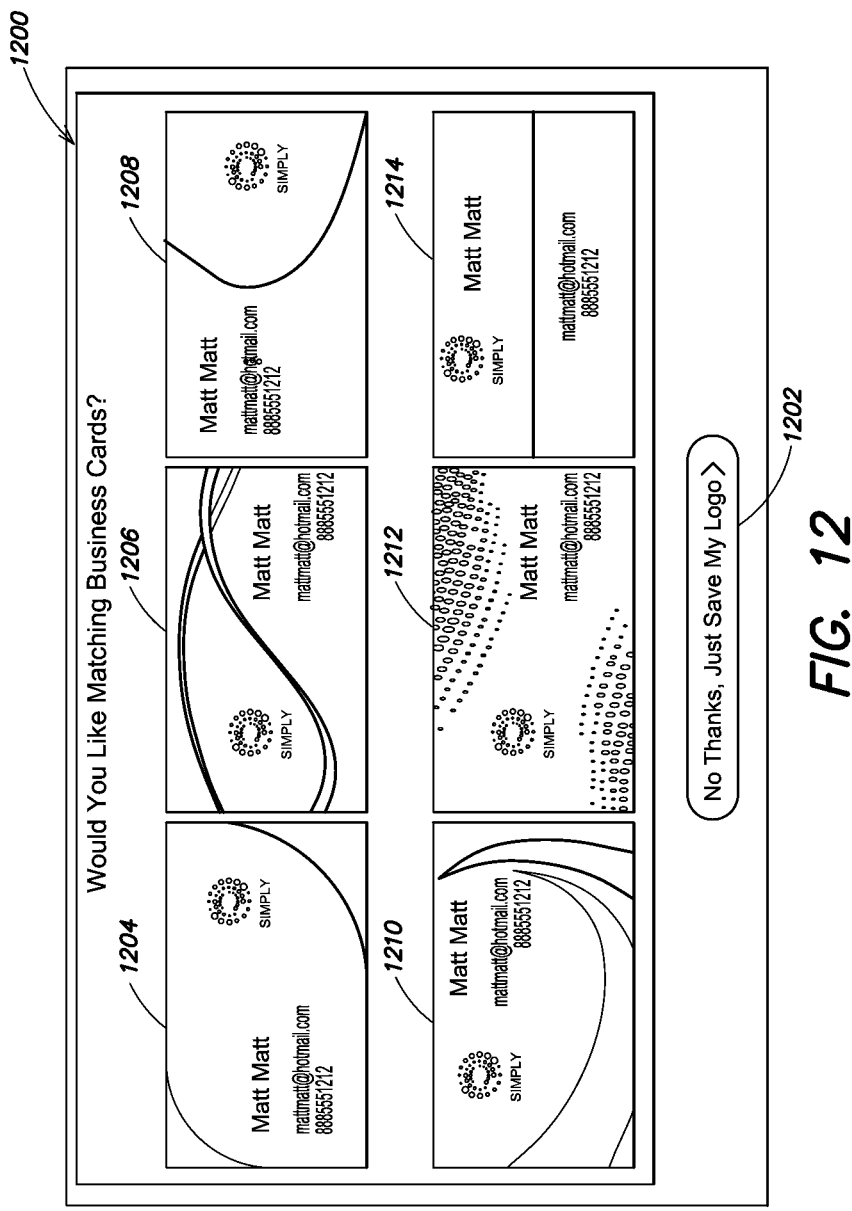
FIG. 12 is a screen capture of an example user interface, according to one embodiment.

According to another embodiment, the system can be configured to present custom products to the user responsive to saving of a logo design. According to one example, an overlay display 1200 FIG. 12 can be shown responsive to saving a logo design. The overlay display 1200 can be configured to present candidate business cards incorporating the current user's logo design, along with user account information (e.g., first and last name, e-mail, and phone number). Each of the business card options (e.g. 1204-1214) can be automatically generated for presentation to the user. In some embodiments, the business card options can be selected by the system for display based on scoring of prior user history.

In other embodiments, the system can be configured to select the elements of each business card design (e.g., any one or more of: color, image, layout, text, font, etc.) based on scoring of the elements within the business cards according to a search/sort score associated with the respective elements determined from, for example, prior user history, as discussed above. In yet other embodiments, the system can select popular layouts and incorporate the current user's logo design. Responsive to selection of a business card, the system transitions to an editing display for the business card (e.g., similar to display 1100). If the user does not wish to design a business card, the user may select 1202 to finalize the saving of the current user's logo design.

Figure 13:
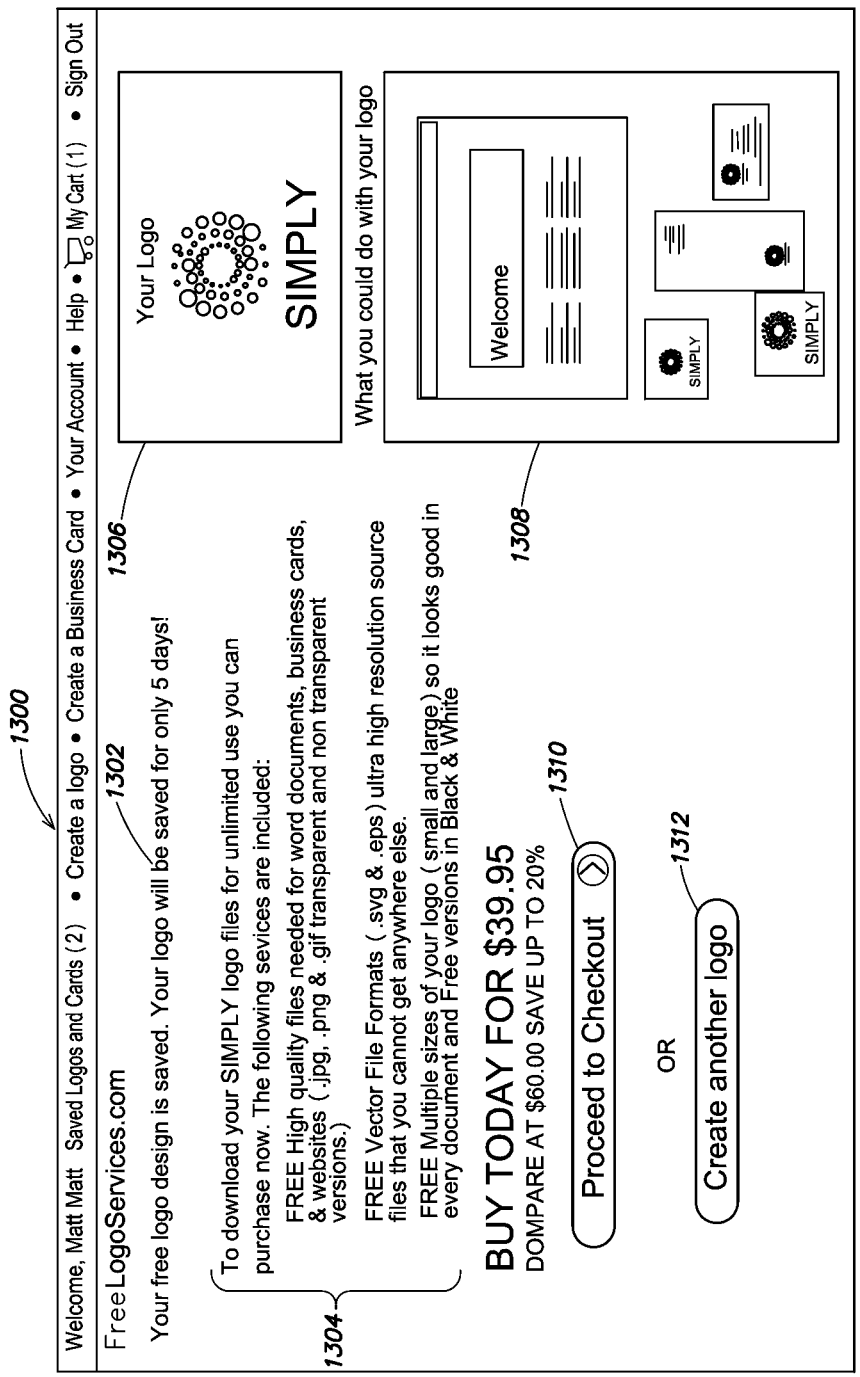
FIG. 13 is a screen capture of an example user interface, according to one embodiment.

FIG. 13 is an example screen capture of a user interface 1300 for purchasing a logo design. The UI 1300 can include notices regarding how long a design will be retained on the system (e.g., at 1302). At 1304, the system displays information on what the user receives upon purchase (e.g., high quality files, file formats —.jpg, .png & .gif, .svg & .eps (for ultra high resolution), among other options). At 1306, a display of the logo design in shown. At 1308, various options for incorporating a logo into other documents, settings, etc., can be shown. For example, at 1308 a web page layout incorporating the user's logo can be shown. Further examples for product that can display logos include business card previews, letterhead, among other options. The potential product options can be generated based on search/sort scoring associated with the user's context. For example, user history can be used to score potential alternative products that are associated with the user's current content (e.g., logo, user information, and/or current activity purchase of logo product, among other options). Responsive to selection of 1310, the system transitions to a payment interface. Alternatively, the user can create another logo responsive to selection of 1312.

Figure 14:
FIG. 14 is a screen capture of an example user interface, according to one embodiment.

FIG. 14 is a screen capture of an example user interface 1400 for providing payment. At 1402, product details are provided for the user's purchase. At 1404 the user can specify the detail regarding their means of payment as well as add any additional features they would like to purchase (e.g., at 1406, the user can upgrade their logo purchase to include—unlimited editing of the current design, social media formatted files, recommended product selection that incorporate the logo (e.g., business cards, novelty items, etc.).

Figure 15:
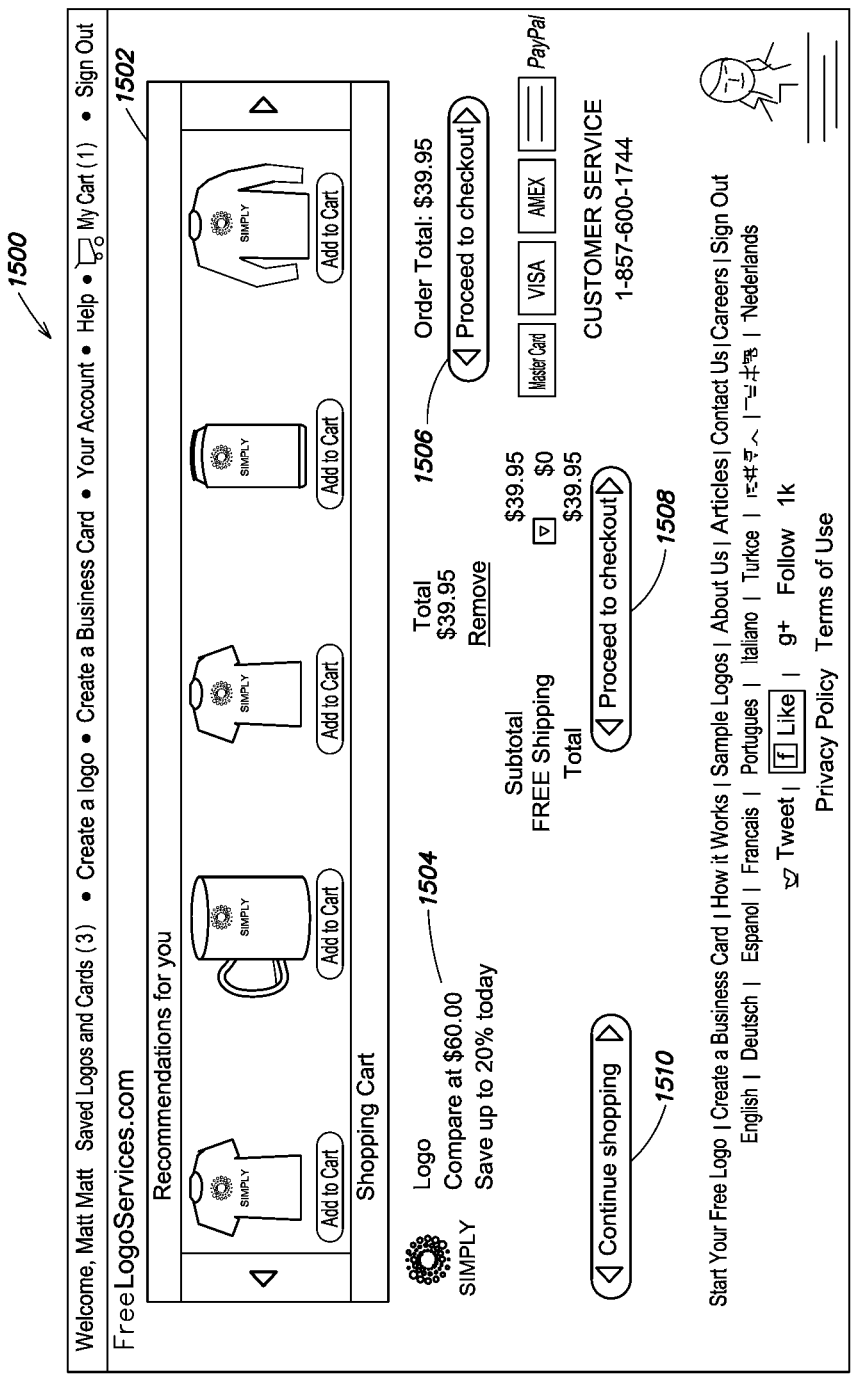
FIG. 15 is a screen capture of an example user interface, according to one embodiment.

FIG. 15 is a screen capture of an example user interface 1500 for displaying a user's purchase cart. At 1502, product recommendations can be displayed to the user upon accessing the cart. The product recommendations can be automatically generated by the system. In some embodiments, the ordering of the product recommendations reflects historical user interactions of previous users and their actions (e.g., selection, view, and/or purchase, among other options) with respect to those products. In some examples, recommended products can be scored as discussed above, for example, with respect to content items or logo designs. Details of the product for purchase can be displayed at 1504. Options for proceeding to payment screens can be presented at 1506 an 1508. The user may also exit the card by selecting "continue shopping" at 1510.

Various embodiments can implement various ones of the example user interfaces discussed. Other embodiments can implement different user interfaces that provide similar functionality.

Example Computer Implementations

Various aspects and functions described herein, in accord with aspects of the present invention, may be implemented as hardware, software, or a combination of hardware and software on one or more computer systems. There are many examples of computer systems currently in use. Some examples include, among others, network appliances, personal computers, workstations, mainframes, networked clients, servers, media servers, application servers, database servers, web servers, and virtual servers. Other examples of computer systems may include mobile computing devices, such as cellular phones, laptops, tablets, and personal digital assistants, and network equipment, such as load balancers, routers and switches. Additionally, aspects in accord with the present invention may be located on a single computer system or may be distributed among one or more computer systems connected to one or more communication networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system components using a variety of hardware and software configurations, and the implementation is not limited to any particular distributed architecture, network, or communication protocol. Furthermore, aspects in accord with the present invention may be implemented as specially-programmed hardware and/or software.

FIG. 16 shows a block diagram of a distributed computer system 1600, in which various aspects and functions in accord with the present invention may be practiced. The distributed computer system 1600 may include one or more computer systems that can be specially configured to perform the functions, operations, and/or processes disclosed herein. For example, as illustrated, the distributed computer system 1600 includes three computer systems 1602, 1604 and 1606. As shown, the computer systems 1602, 1604 and 1606 are interconnected by, and may exchange data through, a communication network 1608. The network 1608 may include any communication network through which computer systems may exchange data. To exchange data via the network 1608, the computer systems 1602, 1604, and 1606 and the network 1608 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA HOP, RMI, DCOM and Web Services.

Computer systems 1602, 1604 and 1606 may include mobile devices such as cellular telephones. The communication network may further employ one or more mobile access technologies including 2nd (2G), 3rd (3G), 4th (4G or LTE) generation radio access for cellular systems, WLAN, Wireless Router (WR) mesh, and other communication technologies. Access technologies such as 2G, 3G, 4G and LTE and future access networks may enable wide area coverage for mobile devices. For example, the network may enable a radio connection through a radio network access such as Global System for Mobil communication (GSM), General Packet Radio Services (GPRS), Enhanced Data GSM Environment (EDGE), Wideband Code Division Multiple Access (WCDMA), among other communication standards. Network may include any wireless communication mechanism by which information may travel between the devices 1604 and other computing devices in the network.

To ensure data transfer is secure, the computer systems 1602, 1604 and 1606 may transmit data via the network 1608 using a variety of security measures including TSL, SSL or VPN, among other security techniques. While the distributed computer system 1600 illustrates three networked computer systems, the distributed computer system 1600 may include any number of computer systems, networked using any medium and communication protocol.

Various aspects and functions in accord with the present invention may be implemented as specialized hardware or software executing in one or more computer systems including the computer system 1602 shown in FIG. 16. As depicted, the computer system 1602 includes a processor 1610, a memory 1612, a bus 1614, an interface 1616 and a storage system 1618. The processor 1610, which may include one or more microprocessors or other types of controllers, can perform a series of instructions that manipulate data. The processor 1610 may be a well-known, commercially available processor such as an Intel Pentium, Intel Atom, ARM Processor, Motorola PowerPC, SGI MIPS, Sun UltraSPARC, or Hewlett-Packard PA-RISC processor, or may be any other type of processor or controller as many other processors and controllers are available. As shown, the processor 1610 is connected to other system placements, including a memory 1612, by the bus 1614.

The memory 1612 may be used for storing programs and data during operation of the computer system 1602. Thus, the memory 1612 may be a relatively high performance, volatile, random access memory such as a dynamic random access memory (DRAM) or static memory (SRAM). However, the memory 1612 may include any device for storing data, such as a disk drive or other non-volatile storage device, such as flash memory or phase-change memory (PCM). Various embodiments in accord with the present invention can organize the memory 1612 into particularized and, in some cases, unique structures to perform the aspects and functions disclosed herein.

Components of the computer system 1602 may be coupled by an interconnection element such as the bus 1614. The bus 1614 may include one or more physical busses (for example, busses between components that are integrated within a same machine), and may include any communication coupling between system placements including specialized or standard computing bus technologies such as IDE, SCSI, PCI and InfiniBand. Thus, the bus 1614 enables communications (for example, data and instructions) to be exchanged between system components of the computer system 1602.

Computer system 1602 also includes one or more interfaces 1616 such as input devices, output devices and combination input/output devices. The interface devices 1616 may receive input, provide output, or both. For example, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 1616 allow the computer system 1602 to exchange information and communicate with external entities, such as users and other systems.

Storage system 1618 may include a computer-readable and computer-writeable nonvolatile storage medium in which instructions are stored that define a program to be executed by the processor. The storage system 1618 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. A medium that can be used with various embodiments may include, for example, optical disk, magnetic disk or flash memory, among others. In operation, the processor 1610 or some other controller may cause data to be read from the nonvolatile recording medium into another memory, such as the memory 1612, that allows for faster access to the information by the processor 1610 than does the storage medium included in the storage system 1618. The memory may be located in the storage system 1618 or in the memory 1612. The processor 1610 may manipulate the data within the memory 1612, and then copy the data to the medium associated with the storage system 1618 after processing is completed. A variety of components may manage data movement between the medium and the memory 1612, and the invention is not limited thereto.

Further, the invention is not limited to a particular memory system or storage system. Although the computer system 1602 is shown by way of example as one type of computer system upon which various aspects and functions in accord with the present invention may be practiced, aspects of the invention are not limited to being implemented on the computer system, shown in FIG. 16. Various aspects and functions in accord with the present invention may be practiced on one or more computers having different architectures or components than that shown in FIG. 16. For instance, the computer system 1602 may include specially-programmed, special-purpose hardware, such as for example, an application-specific integrated circuit (ASIC) tailored to perform a particular operation disclosed herein. Another embodiment may perform the same function using several general-purpose computing devices running MAC OS System X with Motorola PowerPC processors and several specialized computing devices running proprietary hardware and operating systems.

The computer system 1602 may include an operating system that manages at least a portion of the hardware placements included in computer system 1602. A processor or controller, such as processor 1610, may execute an operating system which may be, among others, a Windows-based operating system (for example, Windows NT, Windows 2000/ME, Windows XP, Windows 7, or Windows Vista) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular operating system.

The processor and operating system together define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, functions in accord with aspects of the present invention may be implemented using an object-oriented programming language, such as SmallTalk, JAVA, C++, Ada, or C# (C-Sharp). Other object-oriented programming languages may also be used. Alternatively, procedural, scripting, or logical programming languages may be used.

Additionally, various functions in accord with aspects of the present invention may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed placements, or any combination thereof. For example, a web page may be implemented using HTML while a data object called from within the web page may be written in C++. Thus, the invention is not limited to a specific programming language and any suitable programming language could also be used.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for customizing displayed content selections including displays for fabricating custom objects from the customized content selections, the system comprising:
    at least one processor operatively connected to a memory;
    a search component, executed by the at least one processor, configured to: accept search selection in a user interface displayed to a user, and
    display search results to the user in the user interface, wherein the user interface includes a plurality of displays screens with customized content associated with a step for fabricating a custom object, wherein the plurality of display screens include at least, a first display screen from which the search component receives user specification of descriptive information associated with selecting an image for customizing a plurality of products, a second display configured to display a plurality of images for customizing the plurality of products identified by the search component;
    a modeling component, executed by the at least one processor, configured to score previous users' actions associated with content items displayed to the user, wherein the modeling component is further configured to:
        emphasize user behavior associated with creation of the custom product based on scoring users action in the user interface relative to the step associated with fabricating the custom product;
        assign a respective score to the previews of the custom product or to respective ones of the plurality of images, wherein the scores are assigned relative to steps taken towards the desired user action; and
        index entered or automatically created search terms with the desired user action, wherein at least a portion of the index on the search terms is generated irrespective of meaning associated with the search terms; and
    wherein the search component is further configured to:
        identify search results based, at least in part, on respective action scores assigned to respective content items;
        automatically generate a query responsive to user specification of the descriptive information for customizing the plurality of products in the user interface displayed to the a user, wherein the query is based on, at least in part, the descriptive information for the image for customizing the plurality of products;
        execute the query to return at least search results of images for customizing products and identify the search results based, at least in part, on respective action scores assigned to respective images associated with the descriptive information; and
        communicate the search results for display to the user in the user interface and respective display screen and customize the respective display screen according to modeling of a desired user action.

2. The system according to claim 1, wherein the modeling component is configured execute scoring rules to assign an action value to a respective content item based on a prior user action, and associate the action value to the respective content item.

3. The system according to claim 2, wherein the scoring rules include a plurality of levels for categorizing previous users' actions, and the modeling component is configured to assign the action value based on a determined level associated with the user action.

4. The system according to claim 2, wherein the scoring rules generate relative scores, providing an increase in score for actions more proximate to a final step of creating a custom product relative to actions less proximate to creating the custom product.

5. The system according to claim 4, wherein the search component is configured to generate relevant results based at least in part on a highest action score associated with content items.

6. The system according to claim 2, further comprising a matching component, executed by the at least one processor, configured to match a current user's characteristics to characteristics of prior users.

7. The system according to claim 6, wherein the matching component is configured to filter the previous users' actions scored by the modeling component responsive to matching the current user's characteristics to prior users.

8. The system according to claim 1, wherein the search component is further configured to order the search results based on the previous users' actions.

9. The system according to claim 1, wherein the search component is configured to capture search selections responsive to a user adding a product to an online shopping cart.

10. The system according to claim 9, wherein the search results identified by the search component are displayed to the user as additional selection options for the online shopping cart.

11. The system according to claim 1, wherein the search component is configured to capture search selection responsive to a user navigating within an ecommerce website.

12. The system according to claim 11, wherein the search results identified by the search component are displayed to the user as additional selection options within the ecommerce site.

13. A computer implemented method for customizing displayed content selections including displays for fabricating custom objects from the customized content selections, the method comprising:
    receiving from a user interface displayed to a user a search selection, the act of receiving including receiving from a first display screen user specification of descriptive information associated with selecting an image for customizing a plurality of products;
    communicating search results for display to the user in the user interface including communicating the search results for display in a second display screen including a plurality of images for customizing the plurality of products obtained as search results responsive to user specification of descriptive information associated with selecting an image for customizing a plurality of products and ordered in the second display screen according to respective activity scores;

scoring, by a computer system, previous users' actions associated with content items displayed to the user, wherein the act of scoring includes:

emphasizing user behavior associated with creation of the custom product based on scoring users action in the user interface relative to the step associated with fabricating the custom product;

assigning a respective score to the previews of the custom product or to respective ones of the plurality of images, wherein the scores are assigned relative to steps taken towards the desired user action; and indexing entered or automatically created search terms with the desired user action, wherein at least a portion of the index on the search terms is generated irrespective of meaning associated with the search terms; and identifying, by the computer system, search results based, at least in part, on respective action scores assigned to respective content items, wherein the act of identifying the search results includes:

automatically generating, by a computer system, a query responsive to user specification of the descriptive information for customizing the plurality of products in the user interface displayed to the user, wherein the query is based on, at least in part, the descriptive information for the image for customizing the plurality of products;

executing, by the computer system, the query to return the search results of images for customizing products and identifying the search results based, at least in part, on respective action scores assigned to respective images associated with the descriptive information.

14. The method according to claim 13, wherein scoring includes an act of executing, by the computer system, scoring rules to assign an action value to a content item based on a prior user action with the content item.

15. The method according to claim 14, wherein scoring includes an act of executing, by the computer system, scoring rules to assign an action value to a content item based on determining a level to assign to the prior user action with the content item.

16. The method according to claim 14, wherein the scoring including adding the action value to any existing action value for the content item.

17. The method according to claim 16, wherein identifying, by the computer system relevant results to include in the search results based, at least in part, on highest respective action scores assigned to respective content items.

18. The method according to claim 14, further comprising matching, by the computer system, a current user's characteristics to characteristics of prior users.

19. The method according to claim 18, wherein matching includes filtering the previous users' actions scored by the modeling component responsive to matching the current user's characteristics to prior users.

20. The method according to claim 13, wherein the act of receiving from a user interface displayed to a user the search selection includes capturing the search selection responsive to a user adding a product to an online shopping cart.

21. The method according to claim 20, further comprising an act of displaying the search results as additional selection options within the online shopping cart.

22. The method according to claim 13, wherein the act of receiving from a user interface displayed to a user the search selection includes capturing the search selection responsive to a user navigating within an ecommerce website.

23. The method according to claim 22, wherein the search results identified by the search component are displayed to the user as additional selection options within the ecommerce site.

* * * * *